United States Patent
Shi et al.

(10) Patent No.: US 10,299,211 B2
(45) Date of Patent: May 21, 2019

(54) METHOD FOR SAVING POWER OF USER EQUIPMENT AND DEVICE

(71) Applicant: Huawei Technologies Co., Ltd., Shenzhen (CN)

(72) Inventors: Xiaoyan Shi, Beijing (CN); Xiaolong Guo, Beijing (CN); Wanqiang Zhang, Munich (DE)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 137 days.

(21) Appl. No.: 15/358,616

(22) Filed: Nov. 22, 2016

(65) Prior Publication Data

US 2017/0078968 A1 Mar. 16, 2017

Related U.S. Application Data

(63) Continuation of application No. PCT/CN2014/078106, filed on May 22, 2014.

(51) Int. Cl.
*H04W 52/02* (2009.01)
*H04W 68/00* (2009.01)
(Continued)

(52) U.S. Cl.
CPC ......... *H04W 52/0229* (2013.01); *H04W 4/70* (2018.02); *H04W 68/00* (2013.01);
(Continued)

(58) Field of Classification Search
CPC ....... G06F 1/00; H04W 4/70; H04W 52/0229; H04W 60/02; H04W 68/00;
(Continued)

(56) References Cited

U.S. PATENT DOCUMENTS 9,967,816 B2* 5/2018 Yi ........................... H04W 4/70
2009/0197589 A1 8/2009 Kitazoe
(Continued)

FOREIGN PATENT DOCUMENTS

CN 102149067 A 8/2011
CN 103546968 A 1/2014
(Continued)

OTHER PUBLICATIONS

"3rd Generation Partnership Project; Technical Specification Group Services and System Aspects; General Packet Radio Service (GPRS) enhancements for Evolved Universal Terrestrial Radio Access Network (E-UTRAN) access (Release 12)," 3GPP TS 23.401, V12.4.0, Mar. 2014, 302 pages.
(Continued)

*Primary Examiner* — Robert J Lopata
(74) *Attorney, Agent, or Firm* — Conley Rose, P.C.

(57) ABSTRACT

A method for saving power of UE and a device. The method includes, when determining that downlink data to be sent to UE exists and that the UE is in a power saving mode, recording an event that the downlink data to be sent to the UE exists when the user equipment (UE) is in a power saving mode; and sending, when receiving a tracking area update (TAU) request initiated by the UE, an indication message to the UE, where the indication message is used to indicate that the downlink data to be sent to the UE exists when the UE is in a power saving mode so that the UE obtains the downlink data after setting up a data bearer.

9 Claims, 10 Drawing Sheets

(51) Int. Cl.
*H04W 4/70* (2018.01)
*H04W 76/10* (2018.01)
*H04W 60/02* (2009.01)

(52) U.S. Cl.
CPC ......... *H04W 68/005* (2013.01); *H04W 76/10* (2018.02); *H04W 60/02* (2013.01); *Y02D 70/1224* (2018.01); *Y02D 70/1242* (2018.01); *Y02D 70/1262* (2018.01); *Y02D 70/21* (2018.01)

(58) Field of Classification Search
CPC .... H04W 68/005; H04W 76/10; Y02D 70/00; Y02D 70/1224; Y02D 70/1242; Y02D 70/21
USPC .......................................................... 370/311
See application file for complete search history.

(56) References Cited

U.S. PATENT DOCUMENTS

| | | | |
|---|---|---|---|
| 2011/0171962 A1 | 7/2011 | Iwamura et al. | |
| 2012/0236823 A1* | 9/2012 | Kompella | H04W 24/04 370/331 |
| 2012/0282956 A1* | 11/2012 | Kim | H04L 51/38 455/466 |
| 2012/0307732 A1* | 12/2012 | Olsson | H04W 64/00 370/328 |
| 2013/0021997 A1* | 1/2013 | Lee | H04W 74/0841 370/329 |
| 2013/0203450 A1 | 8/2013 | Mochizuki et al. | |
| 2014/0141782 A1* | 5/2014 | Rantala | H04W 36/0066 455/436 |
| 2015/0103721 A1* | 4/2015 | Yi | H04W 4/70 370/311 |
| 2015/0139054 A1* | 5/2015 | Wu | H04W 52/0225 370/311 |
| 2015/0141030 A1* | 5/2015 | Basu-Mallick | H04W 76/36 455/452.1 |
| 2015/0282009 A1* | 10/2015 | Iwai | H04W 24/10 455/436 |
| 2016/0255584 A1* | 9/2016 | Mutikainen | H04W 52/0216 370/311 |

FOREIGN PATENT DOCUMENTS

| | | |
|---|---|---|
| CN | 103634849 A | 3/2014 |
| EP | 2852211 A1 | 3/2015 |
| RU | 2476030 C2 | 2/2013 |
| RU | 2479157 C2 | 4/2013 |
| WO | 2011116849 A1 | 9/2011 |
| WO | 2015065457 A1 | 5/2015 |

OTHER PUBLICATIONS

"3rd Generation Partnership Project; Technical Specification Group Radio Access Network; Evolved Universal Terrestrial Radio Access Network (E-UTRAN); S1 Application Protocol (S1AP) (Release 10)," 3GPP TS 36.413, V10.3.0, Sep. 2011, 255 pages.

Foreign Communication From a Counterpart Application, European Application No. 14892440.0, Extended European Search Report dated May 17, 2017, 8 pages.

Foreign Communication From a Counterpart Application, PCT Application No. PCT/CN2014/078106, English Translation of International Search Report dated Feb. 17, 2015, 2 pages.

Foreign Communication From a Counterpart Application, PCT Application No. PCT/CN2014/078106, English Translation of International Search Report dated Feb. 17, 2015, 8 pages.

Foreign Communication From a Counterpart Application, Chinese Application No. 2016149621, Chinese Search Report dated Jan. 31, 2018, 2 pages.

Foreign Communication From a Counterpart Application, Chinese Application No. 2016149621, Chinese Office Action dated Feb. 1, 2018, 5 pages.

Foreign Communication From a Counterpart Application, Australian Application No. 2014395016, Australian Examination Report dated Aug. 9, 2017, 3 pages.

Foreign Communication From a Counterpart Application, Australian Application No. 2014395016, Australian Office Action dated Jul. 11, 2018, 3 pages.

* cited by examiner

METHOD FOR SAVING POWER OF USER EQUIPMENT AND DEVICE

CROSS-REFERENCE TO RELATED APPLICATIONS

This application is a continuation of International Application No. PCT/CN2014/078106, filed on May 22, 2014, the disclosure of which is hereby incorporated by reference in its entirety.

TECHNICAL FIELD

The present disclosure relates to the communications field, and in particular, to a method for saving power of UE and a device.

BACKGROUND

In the field of communications technologies, UE (UE) generally has two states, a connected state and an idle state. When the UE is in a connected state, the UE may perform data transmission with a network side. When there is no data transmission for a long time, the UE enters an idle state. In this case, when receiving downlink data of a user, the network side triggers a service request procedure. At this time, a mobility management entity (MME) initiates paging at a tracking area in which the UE is located and the UE responds to the paging of the MME and enters the connected state to receive the data. In order that the UE can be paged by the network side when the downlink data arrives, the UE needs to perform tracking area update (TAU) so as to notify the network side of the tracking area in which the UE is located.

When the UE is in a power saving mode, the UE does not respond to the paging of the network side. Therefore, downlink data that comes from an external network server cannot arrive at the UE and a service from the external network server cannot be implemented. In order that the service from the external network server can be implemented, the UE needs to actively set up a data bearer each time after initiating TAU and sends a data packet to the external network server so as to query whether there is a service request or data triggered by the external network server.

However, in some service scenarios, frequency of triggering a service by the external network server is far lower than frequency of initiating TAU by the UE. Therefore, the UE sets up a data bearer each time initiating a TAU procedure and a large amount of signaling needs to be triggered, which causes huge waste of signaling and large consumption of UE power.

SUMMARY

In view of this, the present disclosure provides a method for saving power of UE and a device so as to resolve problems of signaling waste and power consumption.

Therefore, the following technical solutions are used in embodiments of the present disclosure.

According to a first aspect of the embodiments of the present disclosure, a core network node device is disclosed, where the device includes a recording unit configured to, when it is determined that downlink data to be sent to UE exists and that the UE is in a power saving mode, record an event that the downlink data to be sent to the UE exists when the UE is in a power saving mode, a receiving unit configured to receive a tracking area update TAU request initiated by the UE, and a sending unit configured to, when the TAU request that is initiated by the UE and received by the receiving unit is received and it is determined that the event that the downlink data to be sent to the UE exists when the UE is in a power saving mode is recorded by the recording unit, send an indication message to the UE, where the indication message is used to indicate that the downlink data to be sent to the UE exists when the UE is in a power saving mode so that the UE obtains the downlink data after setting up a data bearer.

With reference to the first aspect of the embodiments of the present disclosure, the embodiment of the present disclosure further has a first possibility where the receiving unit is further configured to receive a downlink data notification message sent by a gateway, or receive a machine type communication (MTC) trigger message that includes address information of an external network server, and the device further includes a determining unit configured to, when the downlink data notification message that is sent by the gateway and received by the receiving unit is received, determine that the downlink data to be sent to the UE exists, or when the MTC trigger message that includes the address information of the external network server and is received by the receiving unit is received, determine that the downlink data to be sent to the UE exists.

With reference to the first aspect of the embodiments of the present disclosure and the first possibility of the embodiment of the present disclosure, the embodiment of the present disclosure further has a second possibility where the sending unit is configured to, when the TAU request that is initiated by the UE and received by the receiving unit is received, send a TAU accept message, where the TAU accept message is used to notify the UE that the downlink data to be sent to the UE exists when the UE is in a power saving mode, and instruct the UE to initiate, after the UE receives the TAU accept message, a service request to set up the data bearer.

With reference to the first possibility of the embodiment of the present disclosure, the embodiment of the present disclosure further has a third possibility where the device further includes a judging unit configured to, when the determining unit determines, according to the downlink data notification message received by the receiving unit, that the downlink data to be sent to the UE exists and the downlink data notification message carries a source address of the downlink data, determine, according to the source address of the downlink data, whether downlink data that comes from the external network server of the UE exists, where the recording unit is configured to, when the judging unit determines that the downlink data that comes from the external network server of the UE exists, record the event that the arriving downlink data exists when the UE is in a power saving mode.

With reference to the third possibility of the embodiment of the present disclosure, the embodiment of the present disclosure further has a fourth possibility where the recording unit is further configured to, when the judging unit determines, according to the source address of the downlink data, that the downlink data that comes from the external network server of the UE does not exist, skip triggering execution of the operation of recording the event that the arriving downlink data exists when the UE is in a power saving mode, and the sending unit is further configured to, when the judging unit determines, according to the source address of the downlink data, that the downlink data that comes from the external network server of the UE does not exist, skip triggering execution of the operation of sending an indication message to the UE.

With reference to the first possibility of the embodiment of the present disclosure, the embodiment of the present disclosure further has a fifth possibility where the sending unit is configured to, when the determining unit determines, according to the downlink data notification message received by the receiving unit, that the downlink data to be sent to the UE exists and the downlink data notification message carries a source address of the downlink data, send an indication message that includes the source address of the downlink data to the UE, where the indication message is used to instruct the UE to determine, according to the source address of the downlink data, whether the downlink data comes from the external network server of the UE, so as to determine whether the UE initiates a service request to set up the data bearer.

With reference to the first aspect of the embodiments of the present disclosure and the first possibility to the fifth possibility of the embodiment of the present disclosure, the embodiment of the present disclosure further has a sixth possibility where the recording unit is configured to, when the core network node device is a source MME, record, by the source MME, the event that the downlink data to be sent to the UE exists when the UE is in a power saving mode, and the sending unit is configured to receive, by the source MME, a context request message that is sent by a target MME to the source MME when the target MME receives the TAU request initiated by the UE, where the context request message is used to request context information of the UE from the source MME, and send, by the source MME, a context response message to the target MME, where the context response message is used to instruct the target MME that the downlink data to be sent to the UE exists when the UE is in a power saving mode so that the target MME sends a TAU accept message to the UE after receiving the context response message, where the TAU accept message is used to indicate that the downlink data to be sent to the UE exists when the UE is in a power saving mode.

With reference to the first aspect of the embodiments of the present disclosure and the first possibility to the sixth possibility of the embodiment of the present disclosure, the embodiment of the present disclosure further has a seventh possibility where the indication message sent by the sending unit is a TAU accept message that includes a user-plane indication, a TAU accept message that includes an activity indication, or a TAU accept message that includes an MTC triggering indication.

With reference to the first aspect of the embodiments of the present disclosure, the embodiment of the present disclosure further has an eighth possibility where the sending unit is configured to, when the TAU request that is initiated by the UE and received by the receiving unit is received, send an initial UE context setup request message so as to set up the data bearer and notify the UE that the downlink data to be sent to the UE exists when the UE is in a power saving mode.

With reference to the eighth possibility of the embodiment of the present disclosure, the embodiment of the present disclosure further has a ninth possibility where the sending unit is configured to send the initial UE context setup request message to a radio access node device to set up the data bearer, where a radio resource control (RRC) bearer setup message that is sent by the radio access node device to the UE is used to notify the UE that the downlink data to be sent to the UE exists when the UE is in a power saving mode, and the device further includes a response message receiving unit configured to receive an initial context setup response message that is sent by the radio access node device after the radio access node device sets up an RRC bearer with the UE.

With reference to the ninth possibility of the embodiment of the present disclosure, the embodiment of the present disclosure further has a tenth possibility where the sending unit is further configured to, after the initial context setup response message that is sent by the radio access node device and received by the response message receiving unit is received, send a TAU accept message to the UE.

According to a second aspect of the embodiments of the present disclosure, UE is disclosed, including a requesting unit configured to initiate a TAU request to a core network node device, an indication message receiving unit configured to receive an indication message that is sent by the core network node device to the UE after the core network node device receives the TAU request sent by the requesting unit and determines an event that downlink data to be sent to the UE exists when the UE is in a power saving mode, where the indication message is used to indicate that the downlink data to be sent to the UE exists when the UE is in a power saving mode, and a data obtaining unit configured to, when it is determined, according to the indication message received by the indication message receiving unit, that the downlink data to be sent to the UE exists when the UE is in a power saving mode, obtain the downlink data after a data bearer is set up.

With reference to the second aspect of the embodiments of the present disclosure, the embodiment of the present disclosure further has an eleventh possibility where the indication message receiving unit is configured to receive a TAU accept message sent by the core network node device, where the TAU accept message is further used to instruct the UE to initiate, after the UE receives the TAU accept message, a service request to set up the data bearer, and the UE further includes a service requesting unit configured to, after the TAU accept message that is sent by the core network node device and received by the indication message receiving unit is received, initiate the service request to a network side to set up the data bearer.

With reference to the eleventh possibility of the embodiment of the present disclosure, the embodiment of the present disclosure further has a twelfth possibility where the UE further includes a judging unit configured to, when the TAU accept message received by the indication message receiving unit includes a source address of the downlink data, determine, according to the source address of the downlink data, whether the downlink data comes from an external network server of the UE, where the service requesting unit is configured to, when the judging unit determines that the downlink data comes from the external network server of the UE, initiate the service request to the network side to set up the data bearer.

With reference to the second aspect of the embodiments of the present disclosure, the embodiment of the present disclosure further has a thirteenth possibility where the indication message receiving unit is configured to receive a data bearer setup message that is sent by the core network node device by using a radio access node device, and the UE further includes an RRC bearer setup unit configured to set up an RRC bearer with the radio access node device after the data bearer setup message that is received by the indication message receiving unit is received.

With reference to the second aspect of the embodiments of the present disclosure and the eleventh possibility to the thirteenth possibility of the embodiment of the present disclosure, the embodiment of the present disclosure further has a fourteenth possibility where the data obtaining unit is configured to, after it is determined that the data bearer is set up with the network side, send a data packet to the network side to acquire the downlink data, or after it is determined that the data bearer is set up with the network side, receive the downlink data that is sent by the network side after the data bearer is set up.

According to a third aspect of the embodiments of the present disclosure, a method for saving power of UE is disclosed, where the method is applied to a core network node device and includes when determining that downlink data to be sent to UE exists and that the UE is in a power saving mode, recording an event that the downlink data to be sent to the UE exists when the UE is in a power saving mode, and sending, when receiving a tracking area update TAU request initiated by the UE, and determining the event that the downlink data to be sent to the UE exists when the UE is in a power saving mode, an indication message to the UE, where the indication message is used to indicate that the downlink data to be sent to the UE exists when the UE is in a power saving mode so that the UE obtains the downlink data after setting up a data bearer.

With reference to the third aspect of the embodiments of the present disclosure, the embodiment of the present disclosure further has a fifteenth possibility where the method further includes receiving a downlink data notification message sent by a gateway, or receiving a MTC trigger message that includes address information of an external network server, where the determining that downlink data to be sent to the UE exists includes, when the downlink data notification message sent by the gateway is received, determining that the downlink data to be sent to the UE exists, or when the MTC trigger message that includes the address information of the external network server is received, determining that the downlink data to be sent to the UE exists.

With reference to the third aspect of the embodiments of the present disclosure and the fifteenth possibility of the embodiment of the present disclosure, the embodiment of the present disclosure further has a sixteenth possibility where the sending, when receiving a tracking area update TAU request initiated by the UE, an indication message to the UE, where the indication message is used to indicate that the downlink data to be sent to the UE exists when the UE is in a power saving mode includes, when the TAU request initiated by the UE is received, sending a TAU accept message, where the TAU accept message is used to notify the UE that the downlink data to be sent to the UE exists when the UE is in a power saving mode, and instruct the UE to initiate, after the UE receives the TAU accept message, a service request to set up the data bearer.

With reference to the fifteenth possibility of the embodiment of the present disclosure, the embodiment of the present disclosure further has a seventeenth possibility where the method further includes after the downlink data notification message sent by the gateway is received and it is determined that the downlink data to be sent to the UE exists, and when it is determined that the downlink data notification message carries a source address of the downlink data, determining, according to the source address of the downlink data, whether downlink data that comes from the external network server of the UE exists, and if the downlink data that comes from the external network server of the UE exists, recording the event that the arriving downlink data exists when the UE is in a power saving mode.

With reference to the seventeenth possibility of the embodiment of the present disclosure, the embodiment of the present disclosure further has an eighteenth possibility where the method further includes, when it is determined, according to the source address of the downlink data, that the downlink data that comes from the external network server of the UE does not exist, skipping triggering execution of the operation of recording the event that the arriving downlink data exists when the UE is in a power saving mode, or skipping triggering execution of the operation of sending an indication message to the UE.

With reference to the fifteenth possibility of the embodiment of the present disclosure, the embodiment of the present disclosure further has a nineteenth possibility where when the downlink data notification message carries a source address of the downlink data, the sending an indication message to the UE includes sending an indication message that includes the source address of the downlink data to the UE, where the indication message is used to instruct the UE to determine, according to the source address of the downlink data, whether the downlink data comes from the external network server of the UE, so as to determine whether the UE initiates a service request to set up the data bearer.

With reference to the third aspect of the embodiments of the present disclosure and the fifteenth possibility to the nineteenth possibility of the embodiment of the present disclosure, the embodiment of the present disclosure further has a twentieth possibility where when the core network node device is a source MME, the recording an event that the downlink data to be sent to the UE exists when the UE is in a power saving mode includes recording, by the source MME, the event that the downlink data to be sent to the UE exists when the UE is in a power saving mode, and the sending, when receiving a tracking area update TAU request initiated by the UE, and determining the event that the downlink data to be sent to the UE exists when the UE is in a power saving mode, an indication message to the UE, where the indication message is used to indicate that the downlink data to be sent to the UE exists when the UE is in a power saving mode includes receiving, by the source MME, a context request message that is sent by a target MME to the source MME when the target MME receives the TAU request initiated by the UE, where the context request message is used to request context information of the UE from the source MME, and sending, by the source MME, a context response message to the target MME, where the context response message is used to instruct the target MME that the downlink data to be sent to the UE exists when the UE is in a power saving mode, so that the target MME sends a TAU accept message to the UE after receiving the context response message, where the TAU accept message is used to indicate that the downlink data to be sent to the UE exists when the UE is in a power saving mode.

With reference to the third aspect of the embodiments of the present disclosure and the fifteenth possibility to the twentieth possibility of the embodiment of the present disclosure, the embodiment of the present disclosure further has a twenty-first possibility where the indication message is a TAU accept message that includes a user-plane indication, a TAU accept message that includes an activity indication, or a TAU accept message that includes an MTC triggering indication.

With reference to the third aspect of the embodiments of the present disclosure, the embodiment of the present disclosure further has a twenty-second possibility and the sending, when receiving a tracking area update TAU request initiated by the UE, an indication message to the UE, where the indication message is used to indicate that the downlink data to be sent to the UE exists when the UE is in a power saving mode includes, when the TAU request that is initiated by the UE is received, sending an initial UE context setup request message so as to set up the data bearer and notify the UE that the downlink data to be sent to the UE exists when the UE is in a power saving mode.

With reference to the twenty-second possibility of the embodiment of the present disclosure, the embodiment of the present disclosure further has a twenty-third possibility, the sending an initial UE context setup request message, so as to set up the data bearer and notify the UE that the downlink data to be sent to the UE exists when the UE is in a power saving mode includes sending the initial UE context setup request message to a radio access node device to set up the data bearer, where a RRC bearer setup message that is sent by the radio access node device to the UE is used to notify the UE that the downlink data to be sent to the UE exists when the UE is in a power saving mode, and the method further includes receiving an initial context setup response message that is sent by the radio access node device after the radio access node device sets up an RRC bearer with the UE.

With reference to the twenty-third possibility of the embodiment of the present disclosure, the embodiment of the present disclosure further has a twenty-fourth possibility where the method further includes, after the initial context setup response message sent by the radio access node device is received, sending a TAU accept message to the UE.

According to a fourth aspect of the embodiments of the present disclosure, a method for saving power of UE is disclosed, where the method is applied to UE and includes initiating a TAU request to a core network node device, receiving an indication message that is sent by the core network node device to the UE after the core network node device receives the TAU request and determines that there is an event that downlink data to be sent to the UE exists when the UE is in a power saving mode, where the indication message is used to indicate that the downlink data to be sent to the UE exists when the UE is in a power saving mode, and when it is determined, according to the indication message, that the downlink data to be sent to the UE exists when the UE is in a power saving mode, obtaining the downlink data after a data bearer is set up.

With reference to the fourth aspect of the embodiments of the present disclosure, the embodiment of the present disclosure further has a twenty-fifth possibility where the receiving an indication message that is sent by the core network node device includes receiving a TAU accept message sent by the core network node device, where the TAU accept message is further used to instruct the UE to initiate, after the UE receives the TAU accept message, a service request to set up the data bearer, and the method further includes, after the TAU accept message sent by the core network node device is received, initiating the service request to a network side to set up the data bearer.

With reference to the twenty-fifth possibility of the embodiment of the present disclosure, the embodiment of the present disclosure further has a twenty-sixth possibility, where when the TAU accept message includes a source address of the downlink data, before the service request is initiated to the network side to set up the data bearer, the method further includes determining, according to the source address of the downlink data, whether the downlink data comes from an external network server of the UE, and if the downlink data comes from the external network server of the UE, initiating the service request to the network side to set up the data bearer.

With reference to the fourth aspect of the embodiment of the present disclosure, the embodiment of the present dis-closure further has a twenty-seventh possibility where the receiving an indication message that is sent by the core network node device includes receiving a data bearer setup message that is sent by the core network node device by using a radio access node device, and the method further includes setting up an RRC bearer with the radio access node device after the data bearer setup message is received.

With reference to the fourth aspect of the embodiments of the present disclosure and the twenty-fifth possibility to the twenty-seventh possibility of the embodiment of the present disclosure, the embodiment of the present disclosure further has a twenty-eighth possibility where the obtaining the downlink data after a data bearer is set up includes after it is determined that the data bearer is set up with the network side, sending a data packet to the network side to acquire the downlink data, or after it is determined that the data bearer is set up with the network side, receiving the downlink data that is sent by the network side after the data bearer is set up.

Analysis of technical effects of the foregoing technical solutions is as follows. In the embodiments of the present disclosure, when UE is in a power saving mode and downlink data to be sent to the UE exists, a core network node device records an event, and when the UE initiates a TAU request, the core network node device instructs, according to the recorded event by using an indication message, the UE that the downlink data to be sent to the UE exists when the UE is in a power saving mode, so that the UE obtains the downlink data after setting up a data bearer. Therefore, no matter a manner of setting up a data bearer by the UE after receiving an indication message, or a manner of actively setting up a data bearer by the core network node device, the UE is indicated when downlink data arrives, which reduces frequency of setting up a data bearer between the UE and a network side, reduces signaling exchanges, and saves power of the UE.

DESCRIPTION OF EMBODIMENTS

The present disclosure is intended to provide a method for saving power of UE and a device to resolve problems in the prior art of signaling waste and power consumption caused by setting up a data bearer each time UE receives downlink data, so as to reduce signaling exchanges and save power of the UE.

The UE generally has two states, a connected state and an idle state. When the UE is in a connected state, the UE may perform data transmission with a network side. When there is no data transmission for a long time, the UE enters an idle state. In this case, when receiving downlink data of a user, the network side triggers a service request procedure. At this time, an MME initiates paging at a tracking area in which the UE is located, and the UE responds to the paging of the MME and enters the connected state to receive the data. In order that the UE can be paged by the network side when the downlink data arrives, the UE needs to perform TAU so as to notify the network side of the tracking area in which the UE is located. TAU includes cross-location-area update and periodical location update. Cross-location-area update occurs when the UE crosses areas, for example, when entering a new area with which the UE does not register, the UE initiates TAU to notify the network side of a tracking area in which the UE is currently located. Periodical location update means that UE periodically initiates TAU to enter a connected state and report, to a network side, a location in which the UE is located.

Figure 1:
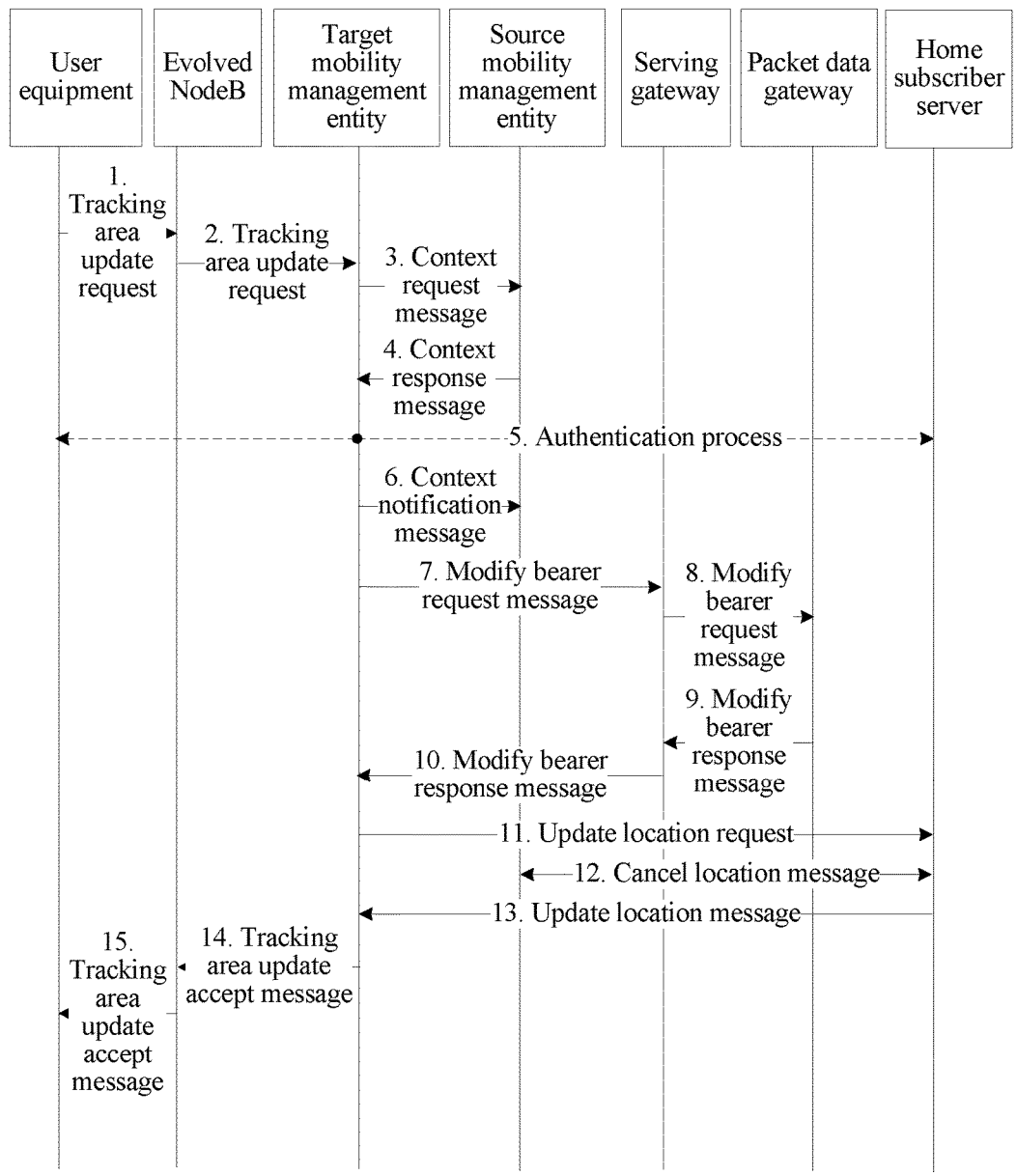
FIG. 1 is a schematic flowchart of tracking area update of UE in the prior art.

Referring to FIG. 1, FIG. 1 is a schematic flowchart of tracking area update of UE in the prior art. In FIG. 1, UE is UE, eNodeB is an evolved NodeB, Target MME is a target mobility management entity, Source MME is a source mobility management entity, S-GW is a serving gateway, P-GW is a packet data network (PDN) gateway, and HSS is a home subscriber server.

Step 1: The UE sends a tracking area update request TAU Request to the eNodeB.

The request carries a globally unique temporary identity (GUTI). The identity is allocated by the Source MME, includes a globally unique MME identifier (GUMMEI), and is provided to the UE in an attach procedure or a previous TAU procedure.

Step 2: The eNodeB forwards a tracking area update request of the UE to an MME that can currently provide a service to the UE (for example, the Target MME).

Step 3: The Target MME learns, according to GUMMEI information, an MME in which context of the UE is located (for example, the Source MME), and sends a context request message to the MME, where the message carries the GUTI identity.

Step 4: The Source MME determines the context of the UE according to the GUTI, and returns a context response message that includes context information of the UE to the Target MME.

Step 5: The Target MME and the HSS implement authentication on the UE and NAS security setting, such as integrity protection and encryption.

Step 6: The Target MME sends a Context Ack message to the Source MME, where the message indicates whether the S-GW in a TAU procedure changes so that the Source MME decides whether to delete corresponding user context of the S-GW.

Step 7: If the S-GW does not change, the Target MME initiates a modify bearer request message Modify Bearer Request to the S-GW, and provides current location information and the like of the UE.

Step 8 and Step 9: occur in a scenario in which a location of the UE changes and the change needs to be reported to the P-GW. The S-GW sends the modify bearer request message Modify Bearer Request to the P-GW and the P-GW returns a modify bearer response message Modify Bearer Response to the S-GW.

Step 10: The S-GW sends the modify bearer response message to the Target MME.

Step 11: The Target MME updates, by using an update location request message Update Location Request, the location information of the UE that is stored in the HSS device.

Step 12: The HSS sends a cancel location message Cancel Location to the Source MME and source MME removes the user context.

Step 13: The HSS sends user subscription data to the Target MME by using an update location message Update Location Ack.

Step 14: The Target MME allocates a new GUTI to the UE, where the GUTI includes a GUMMEI of the Target MME, and the Target MME sends a tracking area update accept message to the eNodeB, where the message carries the newly allocated GUTI.

Step 15: The eNodeB forwards the tracking area update accept message to the UE.

In a process of implementing the present disclosure, it is found that in the prior art shown in FIG. 1, in order to ensure that the network side can accurately page the UE when the downlink data arrives, the UE needs to constantly listen to a network and keep location updating, which causes severe power consumption of the UE. In order to reduce power consumption of the UE, the UE may enable a power saving mode. The UE may request an active time from the network side, and each time after the UE switches from a connected state to an idle state, the UE enables a timer (a time value of the timer is the active time). When the timer expires, the UE enters a power saving mode from the idle state. In a power saving mode, the UE does not listen to a paging message of the network side any longer, for example, the UE does not respond to paging of the network side.

However, after entering a power saving mode, the UE cannot respond to the paging of the network side; therefore, a data packet pushed by an external network server cannot arrive at the UE, and a service triggered by the external network server cannot be implemented, for example, a push service (for example, for a wireless meter reading system, a server of an electric power company may need to query electricity consumption of a user meter) cannot be implemented. To resolve the problem, the UE needs to actively set up a data bearer each time after initiating a tracking area update procedure, and sends a data packet to the external network server so as to query whether a service triggered by the external network server exists. However, in some service scenarios, frequency of triggering a service by the external network server is far lower than frequency of initiating TAU by the UE (for example, frequency of triggering a service by the external network server may be low, for example, once a month, while frequency of initiating tracking area update by the UE may be relatively high, for example, once per hour). Therefore, a large amount of signaling needs to be triggered when the UE sets up a data bearer each time initiating a TAU procedure, which causes huge waste of signaling and large power consumption of the UE.

Therefore, embodiments of the present disclosure provide a method for saving power of UE and a device so as to resolve problems in the prior art of signaling waste and power consumption caused by setting up a data bearer each time UE receives downlink data.

To make a person skilled in the art understand the technical solutions in the present disclosure better, the following clearly describes the technical solutions in the embodiments of the present disclosure with reference to the accompanying drawings in the embodiments of the present disclosure. The described embodiments are merely some rather than all of the embodiments of the present disclosure. All other embodiments obtained by a person of ordinary skill in the art based on the embodiments of the present disclosure without creative efforts shall fall within the protection scope of the present disclosure.

An Embodiment

Figure 2:
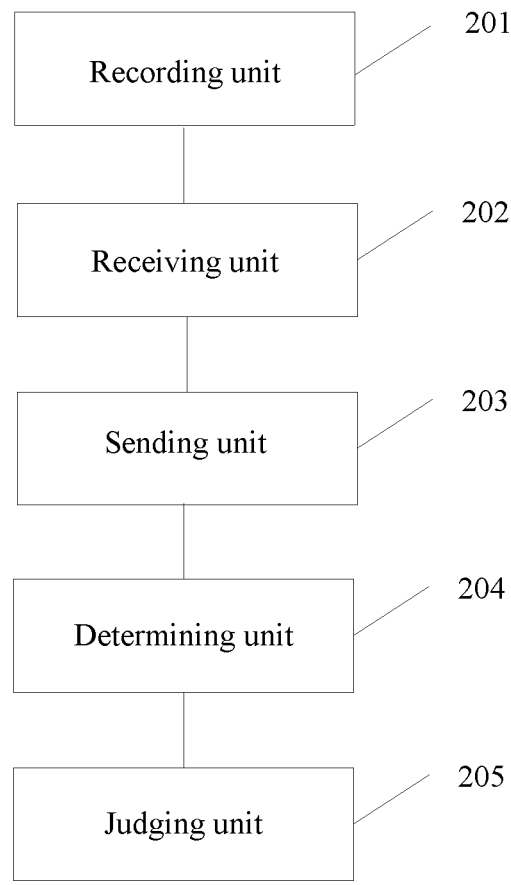
FIG. 2 is a schematic diagram of an embodiment of a core network node device according to the present disclosure.

Referring to FIG. 2, FIG. 2 is a schematic diagram of an embodiment of a core network node device according to the present disclosure. The core network node device shown in FIG. 2 is to implement methods in embodiments shown in the following FIG. 6 to FIG. 13.

It should be noted that, the core network node device provided in the present disclosure may be applied to different communications network systems, which include but are not limited to a System Architecture Evolution (SAE)/Long Term Evolution (LTE) network, a Universal Mobile Telecommunications System (UMTS) network, and Code Division Multiple Access (CDMA) network. The core network node device includes but is not limited to a MME, a serving general packet radio service (GPRS) support node SGSN, or a mobile switching center Mobile Switching Center (MSC), which is not limited herein. For example, for the SAE/LTE network, the core network node device may be an MME, and a radio access node device may be an eNB, for the UMTS network, the core network node device may be an SGSN or an MSC, and a radio access node device may be a radio network controller (RNC) or a nodeB. The following provides descriptions by using an example in which a cellular network is an SAE/LTE network. For implementation in another cellular network, reference may be made to the following embodiment.

The core network node device provided in the present disclosure includes a recording unit 201 configured to, when it is determined that downlink data to be sent to UE exists and that the UE is in a power saving mode, record an event that the downlink data to be sent to the UE exists when the UE is in a power saving mode, a receiving unit 202 configured to receive a tracking area update TAU request initiated by the UE, and a sending unit 203 configured to, when the TAU request that is initiated by the UE and received by the receiving unit 202 is received, and it is determined that the event that the downlink data to be sent to the UE exists when the UE is in a power saving mode is recorded by recording unit 201, send an indication message to the UE, where the indication message is used to indicate that the downlink data to be sent to the UE exists when the UE is in a power saving mode so that the UE obtains the downlink data after setting up a data bearer.

Further, the receiving unit 202 is further configured to receive a downlink data notification message sent by a gateway, or receive a MTC trigger message that includes address information of an external network server.

The core network node device further includes a determining unit 204 configured to, when the downlink data notification message that is sent by the gateway and received by the receiving unit 202 is received, determine that the downlink data to be sent to the UE exists, or when the MTC trigger message that includes the address information of the external network server is received, determine that the downlink data to be sent to the UE exists. A person skilled in the art can understand that, in this embodiment, an example in which the cellular network is an SAE/LTE network is used to provide descriptions, and the core network node device may also determine, in another manner, that the downlink data to be sent to the UE exists. In addition, it should be noted that the UE may request an active time from a network side (the core network node device), and each time after the UE switches from a connected state to an idle state, the UE enables a timer (a time value of the timer is the active time). When the timer expires, the UE enters a power saving mode from the idle state. In a power saving mode, the UE does not listen to a paging message of the network side any longer, for example, the UE does not respond to paging of the network side. Correspondingly, the determining unit 204 of the network side (the core network node device) may determine, according to the active time requested by the UE and a timer enabled by the network side (the core network node device), whether the UE is in a power saving mode.

It should be note that, the recording unit 201 is configured to, when it is determined that the downlink data to be sent to the UE exists and that the UE is in a power saving mode, record the event that the downlink data to be sent to the UE exists when the UE is in a power saving mode.

When the receiving unit 202 of the core network node device receives the TAU request initiated by the UE, and it is determined that the event that the downlink data to be sent to the UE exists when the UE is in a power saving mode is recorded by recording unit 201, the sending unit 203 sends the indication message to the UE, where the indication message is used to indicate that the downlink data to be sent to the UE exists when the UE is in a power saving mode. When receiving the TAU request sent by the UE, the core network node device determines, according to an event record, whether the downlink data to be sent to the UE exists when the UE is in a power saving mode, and if the downlink data to be sent to the UE exists when the UE is in a power saving mode, the core network node device sends the indication message to the UE to indicate that the downlink data to be sent to the UE exists when the UE is in a power saving mode. In an implementation, the indication message sent by the sending unit 203 may be a TAU accept message that includes a user-plane indication, a TAU accept message that includes an activity indication, a TAU accept message that includes an MTC triggering indication, or the like, which is not limited in the present disclosure. The indication message is used to notify the UE that the downlink data arrives when the UE is in a power saving mode so that the UE obtains the downlink data after setting up the data bearer.

According to different manners of setting up a data bearer by the UE and the core network node device, there are different implementation manners in the present disclosure. In one possible implementation manner, the sending unit 203 is configured to, when the TAU request that is initiated by the UE and received by the receiving unit 202 is received, send a tracking area update TAU accept message, where the TAU accept message is used to notify the UE that the downlink data to be sent to the UE exists when the UE is in a power saving mode, and instruct the UE to initiate, after the UE receives the TAU accept message, a service request to set up the data bearer. For example, the indication message sent by the core network node device to the UE is further used to instruct the UE to initiate, after the UE receives the indication message, the service request to set up the data bearer. After receiving the indication message, the UE initiates the service request set up the data bearer. After setting up the data bearer, the UE may actively acquire the downlink data from the network side or wait to receive the downlink data sent by the network side.

Still further, the core network node device may further include a judging unit 205, where the judging unit 205 is configured to determine, according to address information of the downlink data, whether the downlink data comes from the external network server of the UE, and the UE is indicated, by using the indication message, when the downlink data comes from the external network server, so as to avoid that the UE sets up a data bearer due to a packet that does not come from the server. The device further includes the judging unit 205 configured to, when the determining unit 204 determines, according to the downlink data notification message received by the receiving unit 202, that the downlink data to be sent to the UE exists and the downlink data notification message carries a source address of the downlink data, determine, according to the source address of the downlink data, whether downlink data that comes from the external network server of the UE exists.

The recording unit 201 is configured to, when the judging unit 205 determines that the downlink data that comes from the external network server of the UE exists, record the event that the arriving downlink data exists when the UE is in a power saving mode.

Further, the recording unit 201 is further configured to, when the judging unit 205 determines, according to the source address of the downlink data, that the downlink data that comes from the external network server of the UE does not exist, skip triggering execution of the operation of recording the event that the arriving downlink data exists when the UE is in a power saving mode.

The sending unit 203 is further configured to, when the judging unit 205 determines, according to the source address of the downlink data, that the downlink data that comes from the external network server of the UE does not exist, skip triggering execution of the operation of sending an indication message to the UE.

Further, the MME includes the source address of the downlink data into the indication message sent to the UE so that the UE determines, according to the address information, whether the downlink data comes from the external network server of the UE, and the UE initiates, when the downlink data comes from the external network server, the service request to set up the data bearer, so as to avoid that the UE sets up a data bearer due to a packet that does not come from the server. The sending unit 203 is configured to, when the determining unit 204 determines, according to the downlink data notification message received by the receiving unit 202, that the downlink data to be sent to the UE exists and the downlink data notification message carries the source address of the downlink data, send an indication message that includes the source address of the downlink data to the UE, where the indication message is used to instruct the UE to determine, according to the source address of the downlink data, whether the downlink data comes from the external network server of the UE so as to determine whether the UE initiates the service request to set up the data bearer.

Further, when the core network node device is a source MME, the recording unit 201 is configured to record, by the source MME, the event that the downlink data to be sent to the UE exists when the UE is in a power saving mode.

The sending unit 203 is configured to receive, by the source MME, a context request message that is sent by a target MME to the source MME when the target MME receives the TAU request initiated by the UE, where the context request message is used to request context information of the UE from the source MME, and send, by the source MME, a context response message to the target MME, where the context response message is used to instruct the target MME that the downlink data to be sent to the UE exists when the UE is in a power saving mode so that the target MME sends a TAU accept message to the UE after receiving the context response message, where the TAU accept message is used to indicate that the downlink data to be sent to the UE exists when the UE is in a power saving mode.

Further, the indication message sent by the sending unit 203 is the TAU accept message that includes the user-plane indication, the TAU accept message that includes the activity indication, or the TAU accept message that includes the MTC triggering indication.

In another possible implementation manner, when the TAU request that is initiated by the UE and received by the receiving unit 202 is received, the core network node device sends an initial UE context setup request message so as to set up the data bearer and notify the UE that the downlink data to be sent to the UE exists when the UE is in a power saving mode. For example For example, the core network node device notifies, in an implicit indication manner, the UE that the downlink data to be sent to the UE exists when the UE is in a power saving mode. In this implementation manner, the core network node device actively sets up the data bearer.

The sending unit 203 is configured to, when the TAU request that is initiated by the UE and received by the receiving unit 202 is received, send the initial UE context setup request message so as to set up the data bearer and notify the UE that the downlink data to be sent to the UE exists when the UE is in a power saving mode.

Further, the sending unit 203 is configured to send the initial UE context setup request message to a radio access node device to set up the data bearer, where a RRC bearer setup message that is sent by the radio access node device to the UE is used to notify the UE that the downlink data to be sent to the UE exists when the UE is in a power saving mode.

The device further includes a receiving unit 202 configured to receive an initial context setup response message that is sent by the radio access node device after the radio access node device sets up an RRC bearer with the UE.

Further, the sending unit 203 is further configured to, after the initial context setup response message that is sent by the radio access node device and received by the receiving unit 202 is received, send a TAU accept message to the UE.

In this embodiment of the present disclosure, when UE is in a power saving mode and downlink data to be sent to the UE exists, the core network node device records an event, and when the UE initiates a TAU request, the core network node device instructs, according to the recorded event by using an indication message, the UE that the downlink data to be sent to the UE exists when the UE is in a power saving mode, so that the UE obtains the downlink data after setting up a data bearer. Therefore, no matter for a manner of setting up a data bearer by the UE after receiving an indication message, or a manner of actively setting up a data bearer by the core network node device, the UE is indicated when downlink data arrives, which reduces frequency of setting up a data bearer between the UE and a network side, reduces signaling exchanges, and saves power of the UE.

Another Embodiment

Figure 3:
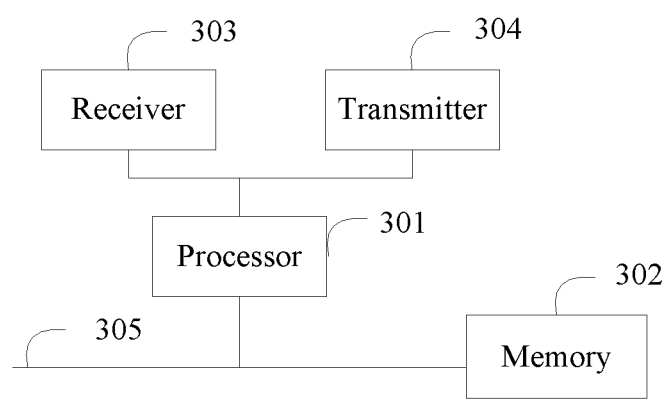
FIG. 3 is a schematic diagram of another embodiment of a core network node device according to the present disclosure.

Referring to FIG. 3, FIG. 3 is a schematic diagram of another embodiment of a core network node device according to the present disclosure. The core network node device shown in FIG. 3 is to implement methods in the following embodiments shown in FIG. 6 to FIG. 13.

FIG. 3 describes a structure of the core network node device provided in another embodiment of the present disclosure, where the core network node device includes at least one processor 301 (such as a central processing unit (CPU)), a memory 302, a receiver 303, a transmitter 304, and at least one communications bus 305 that is configured to implement connection and communication between these apparatuses. The processor 301 is configured to execute an executable module, such as a computer program, stored in the memory 302. The memory 302 may include a high-speed random access memory (RAM), or may include a non-volatile memory, such as at least one magnetic disk memory.

In some implementation manners, the processor 301 is configured to, when it is determined that downlink data to be sent to UE exists and that the UE is in a power saving mode, record an event that the downlink data to be sent to the UE exists when the UE is in a power saving mode.

The receiver 303 is configured to receive a tracking area update TAU request initiated by the UE.

The transmitter 304 is configured to, when the TAU request that is initiated by the UE and received by the receiver 303 is received, and it is determined that the event that the downlink data to be sent to the UE exists when the UE is in a power saving mode is recorded by the processor 301, send an indication message to the UE, where the indication message is used to indicate that the downlink data to be sent to the UE exists when the UE is in a power saving mode, so that the UE obtains the downlink data after setting up a data bearer.

The receiver 303 is further configured to receive a downlink data notification message sent by a gateway, or receive a MTC trigger message that includes address information of an external network server.

The processor 301 is further configured to, when the downlink data notification message that is sent by the gateway and received by the receiver 303 is received, determine that the downlink data to be sent to the UE exists, or when the MTC trigger message that includes the address information of the external network server and is received by the receiver 303 is received, determine that the downlink data to be sent to the UE exists.

The transmitter 304 is configured to, when the TAU request that is initiated by the UE and received by the receiver 303 is received, send a TAU accept message, where the TAU accept message is used to notify the UE that the downlink data to be sent to the UE exists when the UE is in a power saving mode, and instruct the UE to initiate, after the UE receives the TAU accept message, a service request to set up the data bearer.

The processor 301 is further configured to, after the downlink data notification message sent by the gateway is received and it is determined that the downlink data to be sent to the UE exists, and when it is determined that the downlink data notification message carries a source address of the downlink data, determine, according to the source address of the downlink data, whether downlink data that comes from the external network server of the UE exists, and if the downlink data that comes from the external network server of the UE exists, record the event that the arriving downlink data exists when the UE is in a power saving mode.

The processor 301 is further configure to, when it is determined, according to the source address of the downlink data, that the downlink data that comes from the external network server of the UE does not exist, skip triggering execution of the operation of recording the event that the arriving downlink data exists when the UE is in a power saving mode.

The transmitter 304 is further configured to, when the processor 301 determines, according to the source address of the downlink data, that the downlink data that comes from the external network server of the UE does not exist, skip triggering execution of the operation of sending an indication message to the UE.

The transmitter 304 is further configured to, when the processor 301 determines, according to the downlink data notification message received by the receiver 303, that the downlink data to be sent to the UE exists and the downlink data notification message carries the source address of the downlink data, send an indication message that includes the source address of the downlink data to the UE, where the indication message is used to instruct the UE to determine, according to the source address of the downlink data, whether the downlink data comes from the external network server of the UE, so as to determine whether the UE initiates a service request to set up the data bearer.

The processor 301 is further configured to, when the core network node device is a source MME, record, by the source MME, the event that the downlink data to be sent to the UE exists when the UE is in a power saving mode.

The transmitter 304 is configured to receive, by the source MME, a context request message that is sent by a target MME to the source MME when the target MME receives the TAU request initiated by the UE, where the context request message is used to request context information of the UE from the source MME, and send, by the source MME, a context response message to the target MME, where the context response message is used to instruct the target MME that the downlink data to be sent to the UE exists when the UE is in a power saving mode so that the target MME sends a TAU accept message to the UE after receiving the context response message, where the TAU accept message is used to indicate that the downlink data to be sent to the UE exists when the UE is in a power saving mode.

The indication message sent by the transmitter 304 is a TAU accept message that includes a user-plane indication, a TAU accept message that includes an activity indication, or a TAU accept message that includes an MTC triggering indication.

The transmitter 304 is configured to, when the TAU request that is initiated by the UE and received by the receiver 303 is received, send an initial UE context setup request message so as to set up the data bearer and notify the UE that the downlink data to be sent to the UE exists when the UE is in a power saving mode.

The transmitter 304 is configured to send the initial UE context setup request message to a radio access node device to set up the data bearer, where a RRC bearer setup message that is sent by the radio access node device to the UE is used to notify the UE that the downlink data to be sent to the UE exists when the UE is in a power saving mode.

The receiver 303 is further configured to receive an initial context setup response message that is sent by the radio access node device after the radio access node device sets up an RRC bearer with the UE.

The transmitter 304 is further configured to, after the initial context setup response message that is sent by the radio access node device and received by the receiver 303 is received, send a TAU accept message to the UE.

Still Another Embodiment

Figure 4:
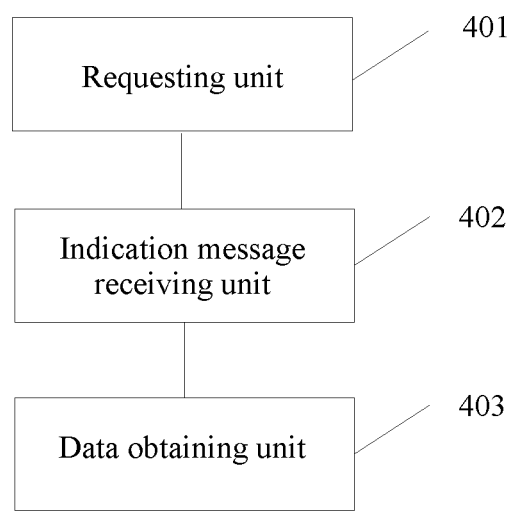
FIG. 4 is a schematic diagram of an embodiment of UE according to the present disclosure.

Referring to FIG. 4, FIG. 4 is a schematic diagram of an embodiment of UE according to the present disclosure. The UE shown in FIG. 4 is to implement methods in the following embodiments shown in FIG. 6 to FIG. 13.

It should be noted that, the UE provided in the present disclosure may be applied to different communications network systems, which include but are not limited to a SAE/LTE network, a UMTS network, a CDMA network, and the like.

The UE includes a requesting unit 401 configured to initiate a tracking area update TAU request to a core network node device, where the UE sends the TAU request to the core network node device, and the TAU request may be a periodical TAU request, an indication message receiving unit 402 configured to receive an indication message that is sent by the core network node device to the UE after the core network node device receives the TAU request sent by the requesting unit 401, and determines an event that downlink data to be sent to the UE exists when the UE is in a power saving mode, where the indication message is used to indicate that the downlink data to be sent to the UE exists when the UE is in a power saving mode, and a data obtaining unit 403 configured to, when it is determined, according to the indication message received by the indication message receiving unit 402, that the downlink data to be sent to the UE exists when the UE is in a power saving mode, obtain the downlink data after a data bearer is set up.

It should be noted that the UE receives the indication message sent by the core network node device, where the indication message is sent to the UE after the core network node device receives the TAU request sent by the UE and determines that the downlink data to be sent to the UE exists when the UE is in a power saving mode. It should be noted that the core network node device is configured to, when determining that the downlink data to be sent to the UE exists and that the UE is in a power saving mode, record the event that the downlink data to be sent to the UE exists when the UE is in a power saving mode. When receiving the TAU request sent by the UE, the core network node device determines, according to a record, whether the downlink data to be sent to the UE exists when the UE is in a power saving mode, and if the downlink data to be sent to the UE exists when the UE is in a power saving mode, the core network node device sends the indication message to the UE, where the indication message is used to indicate that the downlink data to be sent to the UE exists when the UE is in a power saving mode. The indication message received by the indication message receiving unit 402 of the UE may be a TAU accept message that includes a user-plane indication, a TAU accept message that includes an activity indication, or a TAU accept message that includes an MTC triggering indication. The present disclosure sets no limitation on a type of the indication message.

In one possible implementation manner, the indication message receiving unit 402 is configured to receive a TAU accept message sent by the core network node device, where the TAU accept message is further used to instruct the UE to initiate, after the UE receives the TAU accept message, a service request to set up the data bearer.

The UE further includes a requesting unit 401 configured to, after the TAU accept message that is sent by the core network node device and received by the indication message receiving unit 402 is received, initiate the service request to a network side to set up the data bearer.

In another possible implementation manner, when the network side receives the TAU request of the UE, and determines that the downlink data to be sent to the UE exists when the UE is in a power saving mode, the core network node device actively initiates setup of the data bearer.

The indication message receiving unit 402 of the UE is configured to receive a data bearer setup message that is sent by the core network node device by using a radio access node device.

The UE further includes an RRC bearer setup unit configured to set up an RRC bearer with the radio access node device after the data bearer setup message that is received by the indication message receiving unit is received.

In another possible implementation manner, the UE further includes: a judging unit configured to, when the TAU accept message received by the indication message receiving unit 402 includes a source address of the downlink data, determine, according to the source address of the downlink data, whether the downlink data comes from an external network server of the UE.

The service requesting unit 401 is configured to, when the judging unit determines that the downlink data comes from the external network server of the UE, initiate the service request to the network side to set up the data bearer.

Further, the data obtaining unit 403 is configured to, after it is determined that the data bearer is set up with the network side, send a data packet to the network side to acquire the downlink data, or after it is determined that the data bearer is set up with the network side, receive the downlink data that is sent by the network side after the data bearer is set up.

In this embodiment of the present disclosure, when the UE is in a power saving mode and downlink data to be sent to the UE exists, a core network node device records an event, and when the UE initiates a TAU request, the core network node device instructs, according to the recorded event by using an indication message, the UE that the downlink data to be sent to the UE exists when the UE is in a power saving mode so that the UE obtains the downlink data after setting up a data bearer. Therefore, no matter for a manner of setting up a data bearer by the UE after receiving an indication message, or a manner of actively setting up a data bearer by the core network node device, the UE is indicated when downlink data arrives, which reduces frequency of setting up a data bearer between the UE and a network side, reduces signaling exchanges, and saves power of the UE.

Further, in one possible implementation manner, the UE initiates, when receiving the indication message sent by the core network node device and determining, according to the indication message, that the downlink data to be sent to the UE exists when the UE is in a power saving mode, a service request to the network side to set up the data bearer. Different from a manner, in the prior art, of setting up a data bearer each time UE initiates a TAU request, the method provided in this embodiment of the present disclosure greatly reduces frequency of setting up a data bearer between the UE and the network side, reduces signaling exchanges and saves power of the UE.

Still further, in one possible implementation manner, different from a manner, in the prior art, of setting up a data bearer each time UE initiates a TAU request, the UE does not need to set up the data bearer after initiating the TAU request. Instead, the network side (for example, the core network node device) actively sets up the data bearer with the UE when determining that the downlink data to be sent to the UE exists when the UE is in a power saving mode so that the UE acquires the downlink data. Therefore, the UE does not need to set up the data bearer each time initiating a TAU request. According to the method provided in this embodiment of the present disclosure, frequency of setting up a data bearer between the UE and the network side is greatly reduced, signaling exchanges are reduced, and power of the UE is saved.

Yet Another Embodiment

Figure 5:
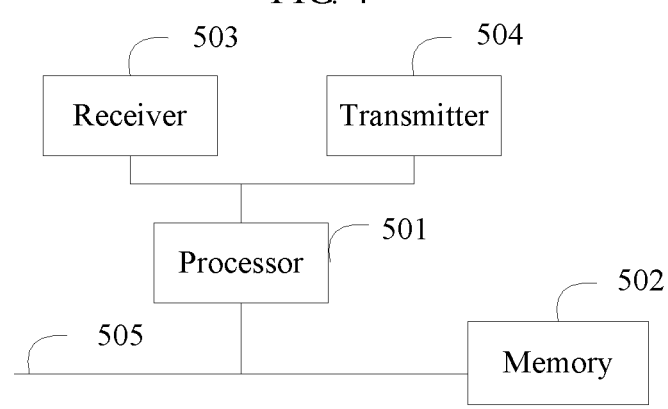
FIG. 5 is a schematic diagram of another embodiment of UE according to the present disclosure.

Referring to FIG. 5, FIG. 5 is a schematic diagram of another embodiment of UE according to the present disclosure. The UE shown in FIG. 5 is to implement methods in the following embodiments shown in FIG. 6 to FIG. 13.

FIG. 5 describes a structure of the UE provided in another embodiment of the present disclosure, where the UE includes at least one processor 501 (such as a CPU), a memory 502, a receiver 503, a transmitter 504, and at least one communications bus 505 that is configured to implement connection and communication between these apparatuses. The processor 501 is configured to execute an executable module, such as a computer program, stored in the memory 502. The memory 502 may include a high-speed RAM, or may include a non-volatile memory, such as at least one magnetic disk memory.

In some implementation manners, the transmitter 504 is configured to initiate a tracking area update TAU request to a core network node device, the receiver 503 is configured to receive an indication message that is sent by the core network node device to the UE after the core network node device receives the TAU request and determines that there is an event that downlink data to be sent to the UE exists when the UE is in a power saving mode, where the indication message is used to indicate that the downlink data to be sent to the UE exists when the UE is in a power saving mode, and the processor 501 is configured to, when it is determined, according to the indication message, that the downlink data to be sent to the UE exists when the UE is in a power saving mode, obtain the downlink data after a data bearer is set up.

The receiver 503 is further configured to receive a TAU accept message sent by the core network node device, where the TAU accept message is further used to instruct the UE to initiate, after the UE receives the TAU accept message, a service request to set up the data bearer.

The processor 501 is further configured to, after the receiver 503 receives the TAU accept message sent by the core network node device, initiate the service request to a network side to set up the data bearer.

The processor 501 is further configured to, when the TAU accept message received by the receiver 503 includes a source address of the downlink data, determine, according to the source address of the downlink data, whether the downlink data comes from an external network server of the UE, and if the downlink data comes from the external network server of the UE, initiate the service request to the network side to set up the data bearer.

The receiver 503 is further configured to receive a data bearer setup message that is sent by the core network node device by using a radio access node device.

The processor 501 is further configured to set up an RRC bearer with the radio access node device after the receiver 503 receives the data bearer setup message.

The processor 501 is further configured to, after it is determined that the data bearer is set up with the network side, send a data packet to the network side to acquire the downlink data, or after it is determined that the data bearer is set up with the network side, receive the downlink data that is sent by the network side after the data bearer is set up.

Still Yet Another Embodiment

Figure 6:
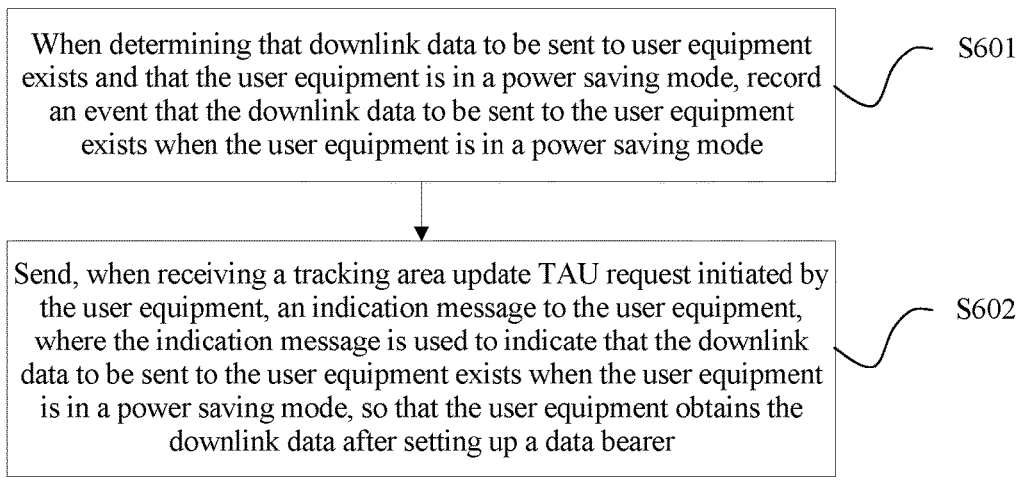
FIG. 6 is a schematic diagram of an embodiment of a method for saving power of UE according to the present disclosure.

Referring to FIG. 6, FIG. 6 is a schematic diagram of an embodiment of a method for saving power of UE according to the present disclosure. The method is applied to a core network node device side. The method provided in the present disclosure may be applied to different communications network systems, which include but are not limited to an SAE/LTE network, a UMTS network, and CDMA, and the like. The core network node device includes but is not limited to a MME, a serving GPRS support node SGSN, or a MSC, which is not limited herein. For example, for the SAE/LTE network, the core network node device may be an MME, and a radio access node device may be an eNB, for the UMTS network, the core network node device may be an SGSN or an MSC, and a radio access node device may be an RNC or a nodeB. The following provides descriptions by using an example in which a cellular network is an SAE/LTE network. For implementation in another cellular network, reference may be made to the following embodiment.

For example, the method may include the following steps.

S601. When determining that downlink data to be sent to UE exists and that the UE is in a power saving mode, record an event that the downlink data to be sent to the UE exists when the UE is in a power saving mode.

In an implementation, the determining, by the core network node device, that downlink data to be sent to UE exists includes, when a downlink data notification message sent by a gateway is received, determining that the downlink data to be sent to the UE exists, or when an MTC trigger message that includes address information of an external network server is received, determining that the downlink data to be sent to the UE exists. A person skilled in the art can understand that, in this embodiment, an example in which the cellular network is an SAE/LTE network is used to provide descriptions, and the core network node device may also determine, in another manner, that the downlink data to be sent to the UE exists.

It should be noted that the UE may request an active time from a network side (the core network node device), and each time after the UE switches from a connected state to an idle state, the UE enables a timer (a time value of the timer is the active time). When the timer expires, the UE enters a power saving mode from the idle state. In a power saving mode, the UE does not listen to a paging message of the network side any longer, for example, the UE does not respond to paging of the network side. Correspondingly, the network side (the core network node device) may also determine, according to the active time requested by a UE side and a timer enabled by the network side (the core network node device), whether the UE is in a power saving mode.

When determining that the downlink data to be sent to the UE exists and that the UE is in a power saving mode, the core network node device records the event that the downlink data to be sent to the UE exists when the UE is in a power saving mode so as to send an indication message to the UE when receiving a TAU request of the UE.

S602. When receiving a tracking area update TAU request initiated by the UE, send an indication message to the UE, where the indication message is used to indicate that the downlink data to be sent to the UE exists when the UE is in a power saving mode so that the UE obtains the downlink data after setting up a data bearer.

When receiving the TAU request initiated by the UE, the core network node device sends the indication message to the UE, where the indication message is used to indicate that the downlink data to be sent to the UE exists when the UE is in a power saving mode. When receiving the TAU request sent by the UE, the core network node device determines, according to an event record, whether the downlink data to be sent to the UE exists when the UE is in a power saving mode, and if the downlink data to be sent to the UE exists when the UE is in a power saving mode, the core network node device sends the indication message to the UE to indicate that the downlink data to be sent to the UE exists when the UE is in a power saving mode. In specific implementation, the indication message may be a TAU accept message that includes a user-plane indication, a TAU accept message that includes an activity indication, a TAU accept message that includes an MTC triggering indication, or the like, which is not limited in the present disclosure. The indication message is used to notify the UE that the downlink data arrives when the UE is in a power saving mode so that the UE obtains the downlink data after setting up the data bearer.

According to different manners of setting up a data bearer by the UE and the core network node device, there are different implementation manners in the present disclosure. In one possible implementation manner, when receiving the tracking area update message TAU request initiated by the UE, the core network node device sends a TAU accept message to notify the UE that the downlink data to be sent to the UE exists when the UE is in a power saving mode and instruct the UE to initiate, after the UE receives the message, a service request to set up the data bearer. For example, the indication message sent by the core network node device to the UE is further used to instruct the UE to initiate, after the UE receives the message, the service request to set up the data bearer. After receiving the indication message, the UE initiates the service request to set up the data bearer. After setting up the data bearer, the UE may actively acquire the downlink data from the network side or wait to receive the downlink data sent by the network side.

In another possible implementation manner, when receiving the tracking area update TAU request initiated by the UE, the core network node device sends an initial UE context setup request message to set up the data bearer and notify the UE that the downlink data to be sent to the UE exists when the UE is in a power saving mode. For example, the core network node device notifies, in an implicit indication manner, the UE that the downlink data to be sent to the UE exists when the UE is in a power saving mode. In this implementation manner, the core network node device actively sets up the data bearer. In specific implementation, the core network node device sends the initial UE context setup request message to a radio access node device to set up the data bearer, where a RRC bearer setup message that is sent by the radio access node device to the UE is used to notify the UE that the downlink data to be sent to the UE exists when the UE is in a power saving mode. The core network node device is further configured to receive an initial context setup response message that is sent by the radio access node device after the radio access node device sets up an RRC bearer with the UE. After receiving the initial context setup response message sent by the radio access node device, the core network node device sends a tracking area update accept message to the UE.

In this embodiment of the present disclosure, when UE is in a power saving mode and downlink data to be sent to the UE exists, a core network node device records an event, and when the UE initiates a TAU request, the core network node device instructs, according to the recorded event by using an indication message, the UE that the downlink data to be sent to the UE exists when the UE is in a power saving mode so that the UE obtains the downlink data after setting up a data bearer. Therefore, no matter for a manner of setting up a data bearer by the UE after receiving an indication message, or a manner of actively setting up a data bearer by the core network node device, the UE is indicated when downlink data arrives, which reduces frequency of setting up a data bearer between the UE and a network side, reduces signaling exchanges, and saves power of the UE.

Further Embodiment

Figure 7:
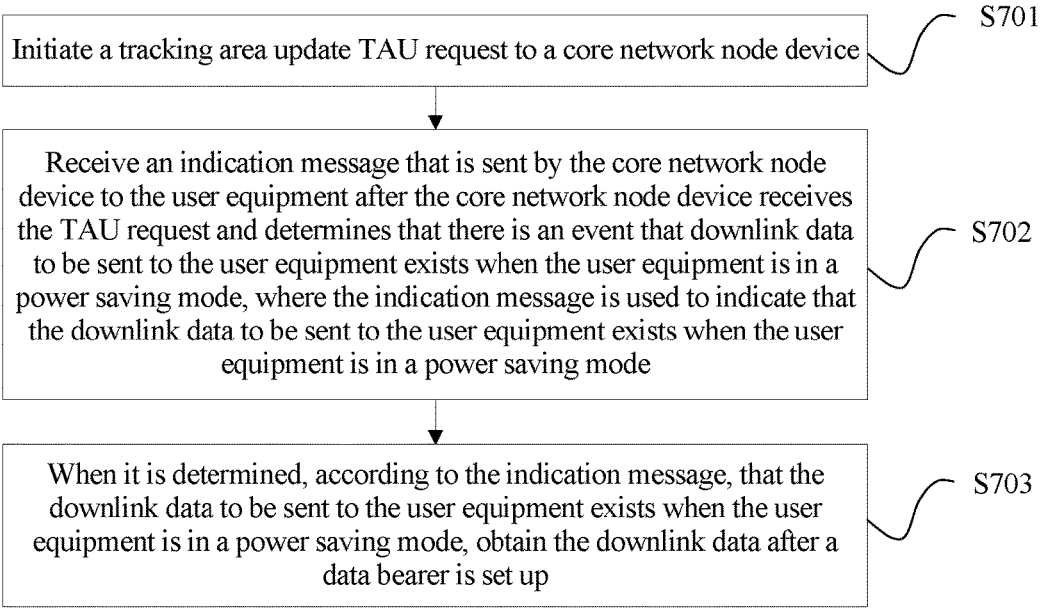
FIG. 7 is a schematic diagram of another embodiment of a method for saving power of UE according to the present disclosure.

Referring to FIG. 7, FIG. 7 is a schematic diagram of another embodiment of a method for saving power of UE according to the present disclosure.

Corresponding to the method shown in FIG. 6, the method shown in FIG. 7 is applied to a UE side. The method provided in the present disclosure may be applied to different communications network systems, which include but are not limited to an SAE/LTE network, a UMTS network, a CDMA network, and the like. A core network node device at the peer end of UE includes but is not limited to an MME, an SGSN, or a mobile switching center MSC. For example, for the SAE/LTE network, the core network node device may be an MME, and a radio access node device may be an eNB, for the UMTS network, the core network node device may be an SGSN or an MSC, and a radio access node device may be an RNC or a nodeB. The following provides descriptions by using an example in which a cellular network is an SAE/LTE network. For implementation in another cellular network, reference may be made to the following embodiment.

S701. Initiate a tracking area update TAU request to the core network node device.

The UE sends the TAU request to the core network node device, where the TAU request may be a periodical TAU request.

S702. Receive an indication message that is sent by the core network node device to the UE after the core network node device receives the TAU request and determines that there is an event that downlink data to be sent to the UE exists when the UE is in a power saving mode, where the indication message is used to indicate that the downlink data to be sent to the UE exists when the UE is in a power saving mode.

The UE receives the indication message sent by the core network node device. The indication message is sent to the UE after the core network node device receives the TAU request sent by the UE and determines that the downlink data to be sent to the UE exists when the UE is in a power saving mode. It should be note that the core network node device is configured to, when determining that the downlink data to be sent to the UE exists and that the UE is in a power saving mode, record the event that the downlink data to be sent to the UE exists when the UE is in a power saving mode. When receiving the TAU request sent by the UE, the core network node device determines, according to a record, whether the downlink data to be sent to the UE exists when the UE is in a power saving mode, and if the downlink data to be sent to the UE exists when the UE is in a power saving mode, the core network node device sends the indication message to the UE to indicate that the downlink data to be sent to the UE exists when the UE is in a power saving mode. The indication message received by the UE may be a TAU accept message that includes a user-plane indication, a TAU accept message that includes an activity indication, or a TAU accept message that includes an MTC triggering indication. The present disclosure sets no limitation on a type of the indication message.

It should be noted that, the receiving, by the UE, an indication message that is sent by the core network node device includes receiving, by the UE, a tracking area update accept message sent by the core network node device, where the message is further used to instruct the UE to initiate, after the UE receives the message, a service request to set up a data bearer. The method further includes initiating the service request to a network side to set up the data bearer. In this implementation manner, the core network node device instructs, by using the tracking area update accept message, the UE to set up the data bearer. After receiving the indication message, the UE initiates a data request to the network side to set up the data bearer. After setting up the data bearer, the UE may acquire the downlink data.

In another possible implementation manner, when receiving the TAU request of the UE, and determining that the downlink data to be sent to the UE exists when the UE is in a power saving mode, the network side actively initiates setup of the data bearer. For example, the receiving, by the UE, an indication message that is sent by the core network node device includes receiving, by the UE, a data bearer setup message that is sent by the core network node device by using a radio access node device, and the method further includes setting up an RRC bearer with the radio access node device. In specific implementation, the core network node device sends an initial UE context setup request message to the radio access node device to set up the data bearer, where a RRC bearer setup message that is sent by the radio access node device to the UE is used to notify the UE that the downlink data to be sent to the UE exists when the UE is in a power saving mode, and the UE sets up the RRC bearer with the radio access node device. Afterward, after setting up the RRC bearer with the UE, the radio access node device sends an initial context setup response message to the core network node device. After receiving the initial context setup response message, the core network node device sends a TAU accept message to the UE.

S703. When it is determined, according to the indication message, that the downlink data to be sent to the UE exists when the UE is in a power saving mode, obtain the downlink data after a data bearer is set up.

The obtaining, by the UE after setting up the data bearer with the network side, the downlink data includes sending a data packet to the network side to obtain the downlink data, or receiving the downlink data that is sent by the network side after the data bearer is set up.

In this embodiment of the present disclosure, when UE is in a power saving mode and downlink data to be sent to the UE exists, a core network node device records an event, and when the UE initiates a TAU request, the core network node device instructs, according to the recorded event by using an indication message, the UE that the downlink data to be sent to the UE exists when the UE is in a power saving mode so that the UE obtains the downlink data after setting up a data bearer. Therefore, no matter for a manner of setting up a data bearer by the UE after receiving an indication message, or a manner of actively setting up a data bearer by the core network node device, the UE is indicated when downlink data arrives, which reduces frequency of setting up a data bearer between the UE and a network side, reduces signaling exchanges, and saves power of the UE.

Further, in one possible implementation manner, the UE initiates, when receiving the indication message sent by the core network node device and determining, according to the indication message, that the downlink data to be sent to the UE exists when the UE is in a power saving mode, a data request to the network side to set up the data bearer. Different from a manner, in the prior art, of setting up a data bearer each time UE initiates a TAU request, the method provided in this embodiment of the present disclosure greatly reduces frequency of setting up a data bearer between the UE and the network side, reduces signaling exchanges, and saves power of the UE.

Still further, in one possible implementation manner, different from a manner, in the prior art, of setting up a data bearer each time UE initiates a TAU request, the UE does not need to set up the data bearer after initiating the TAU request. Instead, the network side (for example, the core network node device) actively sets up the data bearer with the UE when determining that the downlink data to be sent to the UE exists when the UE is in a power saving mode so that the UE acquires the downlink data. Therefore, the UE does not need to set up the data bearer each time initiating a TAU request. According to the method provided in this embodiment of the present disclosure, frequency of setting up a data bearer between the UE and the network side is greatly reduced, signaling exchanges are reduced, and power of the UE is saved.

Still Further Embodiment

The following describes specific implementation of the present disclosure in detail with reference to FIG. 8 to FIG. 13, and the following embodiments are improvement or variation of the embodiment shown in FIG. 6 or FIG. 7. It should be noted that the following provides descriptions by using an example in which a cellular network is an SAE/LTE network. For implementation in another cellular network, reference may be made to the following embodiment. A core network node device is an MME, a radio access node device is an eNB, and a terminal is UE.

Figure 8:
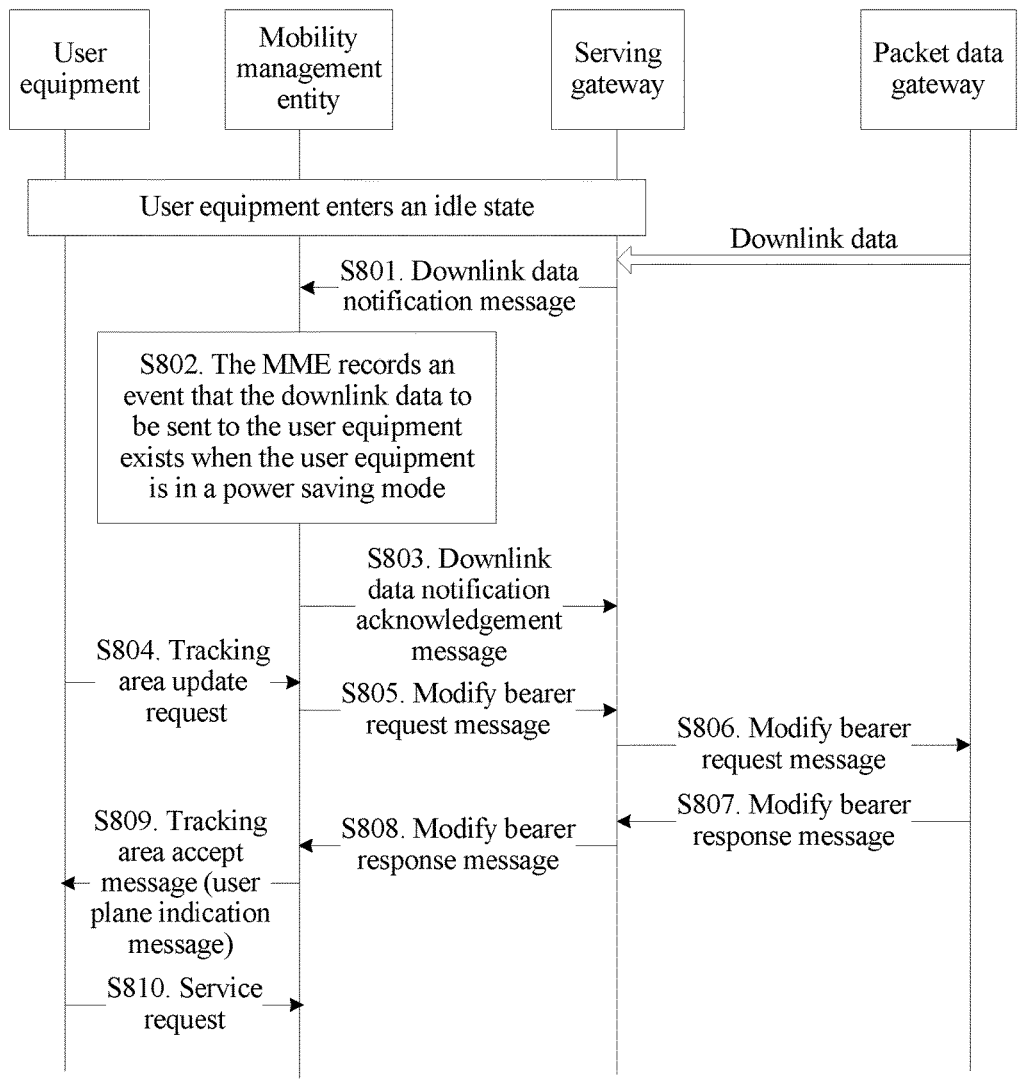
FIG. 8 is a schematic diagram of still another embodiment of a method for saving power of UE according to the present disclosure.

Referring to FIG. 8, FIG. 8 is a schematic diagram of still another embodiment of a method for saving power of UE according to the present disclosure.

S801. When UE is in an idle state (the UE enters the idle state), and a S-GW receives downlink data, send a downlink data notification message Downlink Data Notification to an MME.

S802. The MME receives the downlink data notification message Downlink Data Notification sent by the S-GW, and when determining that the UE is in a power saving mode, the MME records an event that the downlink data to be sent to the UE exists when the UE is in a power saving mode.

Optionally, the MME may cache the downlink data, or may not cache the downlink data.

S803. The MME sends a downlink data notification acknowledgement message Downlink Data Notification Ack to the S-GW, where the message carries a reject cause value.

S804. The UE initiates a periodical tracking area update request TAU request to the MME.

S805. The MME sends a modify bearer request message Modify Bearer Request to the S-GW, and provides current location information and the like of the UE. When the S-GW determines, according to the message sent by the MME, that a location of the UE changes, execute S806 and S807. When the S-GW determines, according to the message sent by the MME, that a location of the UE does not change, execute S808.

S806. When the location of the UE changes, the S-GW sends the modify bearer request message Modify Bearer Request to a P-GW.

S807. The P-GW sends a modify bearer response message Modify Bearer Response to the S-GW.

S808. The S-GW sends the modify bearer response message Modify Bearer Response to the MME.

S809. The MME sends a tracking area update accept message TAU accept (carrying a user plane indication message) to the UE, indicates, by using the indication message, that the downlink data to be sent to the UE exists when the UE in a power saving mode, and indicates that the UE needs to set up a data bearer.

S810. The UE initiates, according to the indication message, a service request to set up the data bearer.

Further, after setting up the data bearer, the UE may send a data packet to an external network server to query whether a service triggered by the external network server exists so as to obtain the downlink service data. Alternatively, the UE may wait for the external network server to send the data to the UE. Optionally, when the MME caches the downlink data, the UE may acquire the downlink data from the MME.

In this embodiment of the present disclosure, an MME records an event when determining that UE is in a power saving mode and that downlink data to be sent to the UE exists, and when the UE initiates a TAU request, the MME instructs, according to the recorded event by using an indication message, the UE that the downlink data to be sent to the UE exists when the UE is in a power saving mode, and notifies the UE of setting up a data bearer. In this case, the UE initiates, when receiving the indication message sent by the MME and determining, according to the indication message, that the downlink data to be sent to the UE exists when the UE is in a power saving mode, a service request to a network side to set up the data bearer. Different from a manner, in the prior art, of setting up a data bearer each time UE initiates a TAU request, the method provided in this embodiment of the present disclosure greatly reduces frequency of setting up a data bearer between the UE and the network side, reduces signaling exchanges, and saves power of the UE.

Yet Further Embodiment

Figure 9:
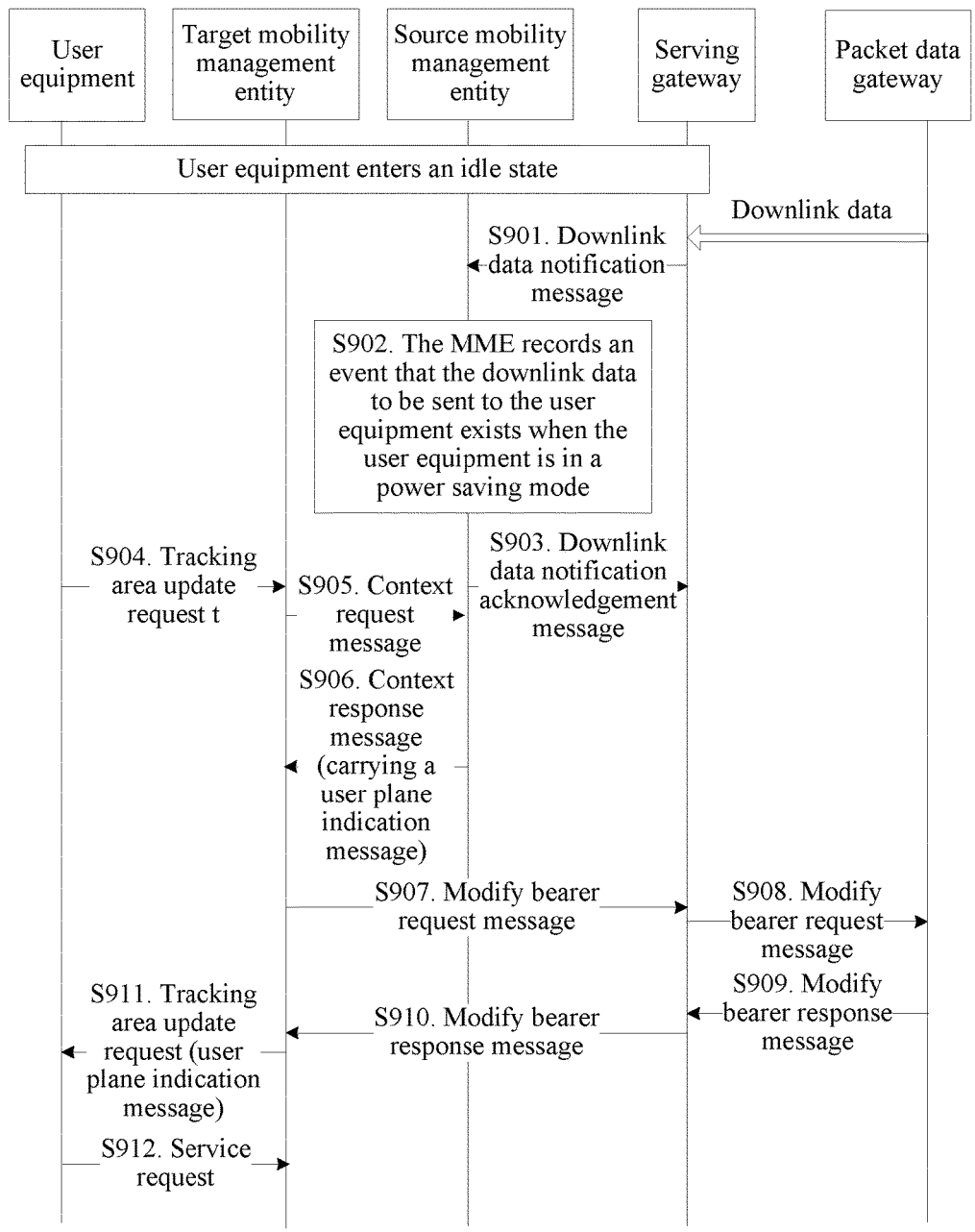
FIG. 9 is a schematic diagram of yet another embodiment for saving power of UE according to the present disclosure.

Referring to FIG. 9, FIG. 9 is a schematic diagram of yet another embodiment of a method for saving power of UE according to the present disclosure.

When UE initiates a tracking area update request and an MME changes, a Target MME requests, by using a context request message, context information of the UE from a Source MME when receiving the tracking area update TAU request initiated by the UE, the Source MME indicates, by using a context response message, that downlink data to be sent to the UE exists when the UE is in a power saving mode, and the Target MME indicates, by using a tracking area update accept message, that the downlink data to be sent to the UE exists when the UE is in a power saving mode so as to instruct the UE to set up a data bearer.

S901. When UE that registers with a Source MME is in an idle state, a S-GW receives downlink data and sends a downlink data notification message Downlink Data Notification to the Source MME.

S902. The Source MME receives the downlink data notification message Downlink Data Notification sent by the S-GW, and when determining that the UE is in a power saving mode, the Source MME records an event that the downlink data to be sent to the UE exists when the UE is in a power saving mode.

Optionally, the Source MME may cache the downlink data, or may not cache the downlink data.

S903. The Source MME sends a downlink data notification acknowledgement message Downlink Data Notification Ack to the S-GW, where the message carries a reject cause value.

S904. The UE initiates a periodical tracking area update request TAU request to a Target MME. When the UE initiates the TAU request, the MME has changed from the Source MME to the Target MME. In this case, the request sent by the UE carries a temporary ID that includes a Source MME ID.

S905. The Target MME requests context information of the UE from the Source MME by using a context request message context Request.

When determining, by using the TAU request sent by the UE, that the MME changes, the Target MME sends the context request message to the Source MME to request the context information of the UE. For example, when determining, by using the temporary identification (ID) (including the Source MME ID) carried in the TAU request that is sent by the UE, that the MME changes, the Target MME determines, according to the temporary ID, a Source MME corresponding to the UE, and initiates the context request message to the Source MME so as to request the context information of the UE from the Source MME.

S906. The Source MME sends a context response message to the Target MME, where a user plane indication is carried in the context response message to indicate that the UE needs to set up a data bearer, for example, the downlink data to be sent to the UE exists when the UE is in a power saving mode.

S907. The Target MME sends a modify bearer request message Modify Bearer Request to the S-GW, and provides current location information and the like of the UE. When the S-GW determines, according to the message sent by the Target MME, that a location of the UE changes, execute S908 and S909; otherwise, execute S910.

S908. When the location of the UE changes, the S-GW sends the modify bearer request message Modify Bearer Request to a P-GW.

S909. The P-GW sends a modify bearer response message Modify Bearer Response to the S-GW.

S910. The S-GW sends the modify bearer response message Modify Bearer Response to the MME.

S911. The Target MME sends a tracking area update accept message TAU accept to the UE, indicates, by using an indication message, that the downlink data to be sent to the UE exists when the UE saves power, and indicates that the UE needs to set up the data bearer.

S912. The UE initiates, according to the indication message, a service request to set up the data bearer.

Further, after setting up the data bearer, the UE may send a data packet to an external network server to query whether a service triggered by the external network server exists so as to obtain the downlink service data. Alternatively, the UE may wait for the external network server to send the data to the UE. Optionally, when the Source MME caches the downlink data, the UE may acquire the downlink data from the Source MME.

In this embodiment of the present disclosure, a Source MME records an event when determining that UE is in a power saving mode and that downlink data to be sent to the UE exists, and when the UE initiates a TAU request, the Source MME instructs, according to the recorded event by using a context response message, the UE that the downlink data to be sent to the UE exists when the UE is in a power saving mode, and notifies the UE of setting up a data bearer. In this case, the UE initiates, when receiving an indication message sent by the MME and determining, according to the indication message, that the downlink data to be sent to the UE exists when the UE is in a power saving mode, a service request to a network side to set up the data bearer. Different from a manner, in the prior art, of setting up a data bearer each time UE initiates a TAU request, the method provided in this embodiment of the present disclosure greatly reduces frequency of setting up a data bearer between the UE and the network side, reduces signaling exchanges, and saves power of the UE.

Still Yet Further Embodiment

Figure 10:
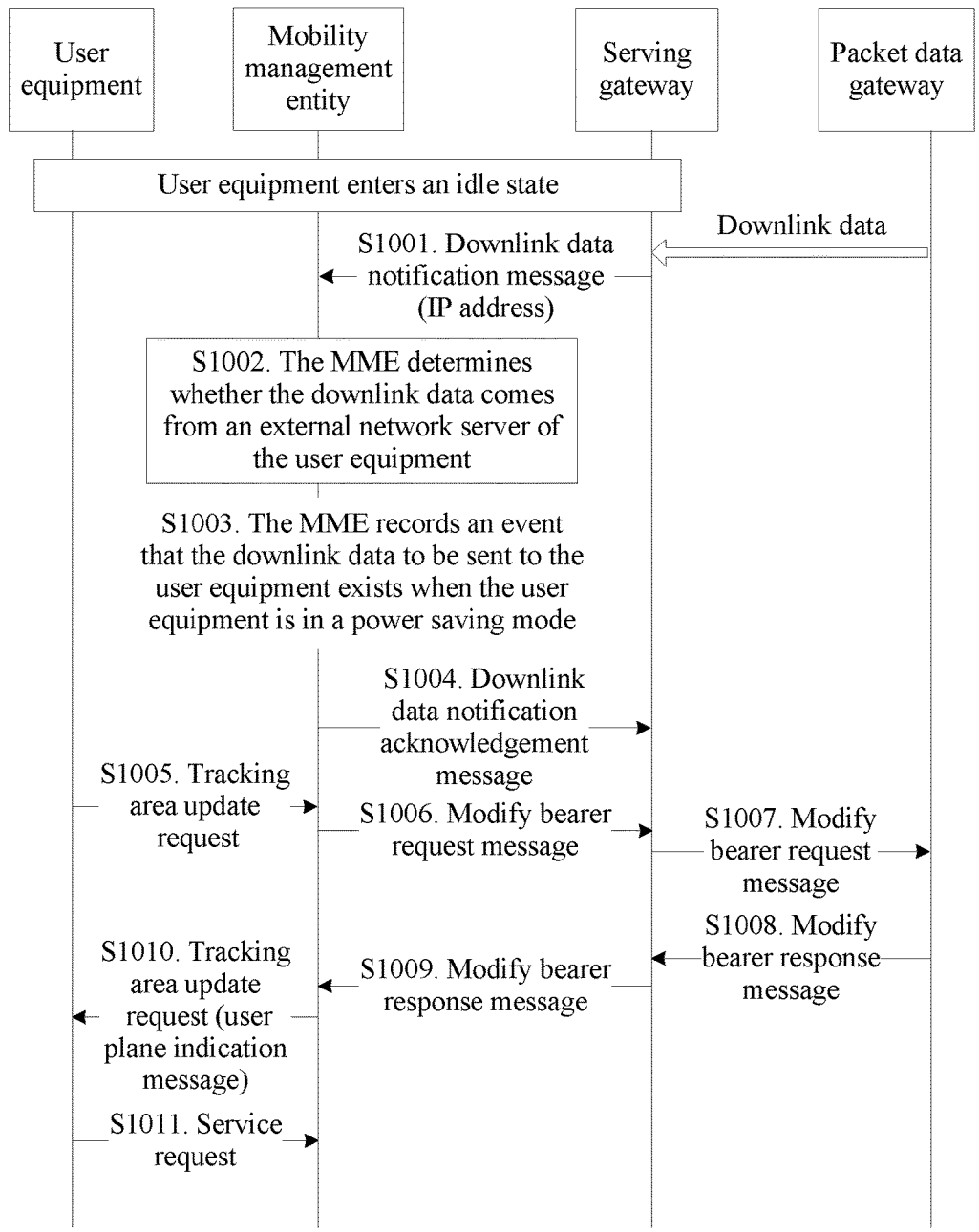
FIG. 10 is a schematic diagram of still yet another embodiment of a method for saving power of UE according to the present disclosure.

Referring to FIG. 10, FIG. 10 is a schematic diagram of still yet another embodiment of a method for saving power of UE according to the present disclosure.

In this embodiment of the present disclosure, a S-GW adds a source address of downlink data to a downlink data notification message sent to an MME, the MME determines, according to address information, whether the downlink data comes from an external network server of the UE, and the UE is indicated, by using an indication message, when the downlink data comes from the external network server so as to avoid setting up a data bearer by the UE due to a packet that does not come from the server.

S1001. When UE is in an idle state, a S-GW receives downlink data, and sends a downlink data notification message Downlink Data Notification to an MME, where the downlink data notification message carries a source Internet Protocol (IP) address of the downlink data.

S1002. The MME receives the downlink data notification message Downlink Data Notification sent by the S-GW, and when determining that the UE is in a power saving mode, the MME determines, according to the source IP address of the downlink data, whether the downlink data comes from an external network server of the UE. If the downlink data comes from the external network server of the UE, execute S1003 of recording an event that the arriving downlink data exists when the UE is in a power saving mode, and send an indication message to the UE when a tracking area update TAU request initiated by the UE is received. If the downlink data does not come from the external network server of the UE, skip triggering execution of S1003, for example, skip triggering execution of the operation of recording an event that the arriving downlink data exists when the UE is in a power saving mode, skip triggering execution of the operation of sending an indication message to the UE.

S1003. When determining, according to the source IP address of the downlink data, that the downlink data comes from the external network server of the UE, the MME records an event that the downlink to be sent to the UE exists when the UE is in a power saving mode.

Optionally, the MME may cache the downlink data, or may not cache the downlink data.

S1004. The MME sends a downlink data notification acknowledgement message Downlink Data Notification Ack to the S-GW, where the message carries a reject cause value.

S1005. The UE initiates a periodical tracking area update request TAU request to the MME.

S1006. The MME sends a modify bearer request message Modify Bearer Request to the S-GW, and provides current location information and the like of the UE. When the S-GW determines, according to the message sent by the MME, that a location of the UE changes, execute S1007 and S1008; otherwise, execute S1009.

S1007. When the location of the UE changes, the S-GW sends the modify bearer request message Modify Bearer Request to a P-GW.

S1008. The P-GW sends a modify bearer response message Modify Bearer Response to the S-GW.

S1009. The S-GW sends the modify bearer response message Modify Bearer Response to the MME.

S1010. The MME sends a tracking area update accept message TAU accept to the UE, indicates, by using an indication message, that the downlink data to be sent to the UE exists when the UE saves power, and indicates that the UE needs to set up a data bearer.

S1011. The UE initiates, according to the indication message, a service request to set up the data bearer.

Further, after setting up the data bearer, the UE may send a data packet to the external network server to query whether a service triggered by the external network server exists so as to obtain the downlink service data. Alternatively, the UE may wait for the external network server to send the data to the UE. Optionally, when the MME caches the downlink data, the UE may acquire the downlink data from the MME.

In this embodiment of the present disclosure, when determining that a downlink data notification message sent by a S-GW carries a source address of downlink data, an MME determines, according to the source address of the downlink data, whether the downlink data comes from an external network server of UE. If the downlink data comes from the external network server of the UE, records an event that the arriving downlink data exists when the UE is in a power saving mode, and sends an indication message the UE when a tracking area update TAU request initiated by the UE is received, and if the downlink data does not come from the external network server of the UE, skips triggering execution of the operation of recording an event that the arriving downlink data exists when the UE is in a power saving mode, skips triggering execution of the operation of sending an indication message to the UE. Therefore, the UE is instructed to set up a data bearer when the downlink data comes from the external network server of the UE so as to avoid that the UE sets up a data bearer due to a packet that does not come from the server.

Even Yet Another Embodiment

Figure 11:
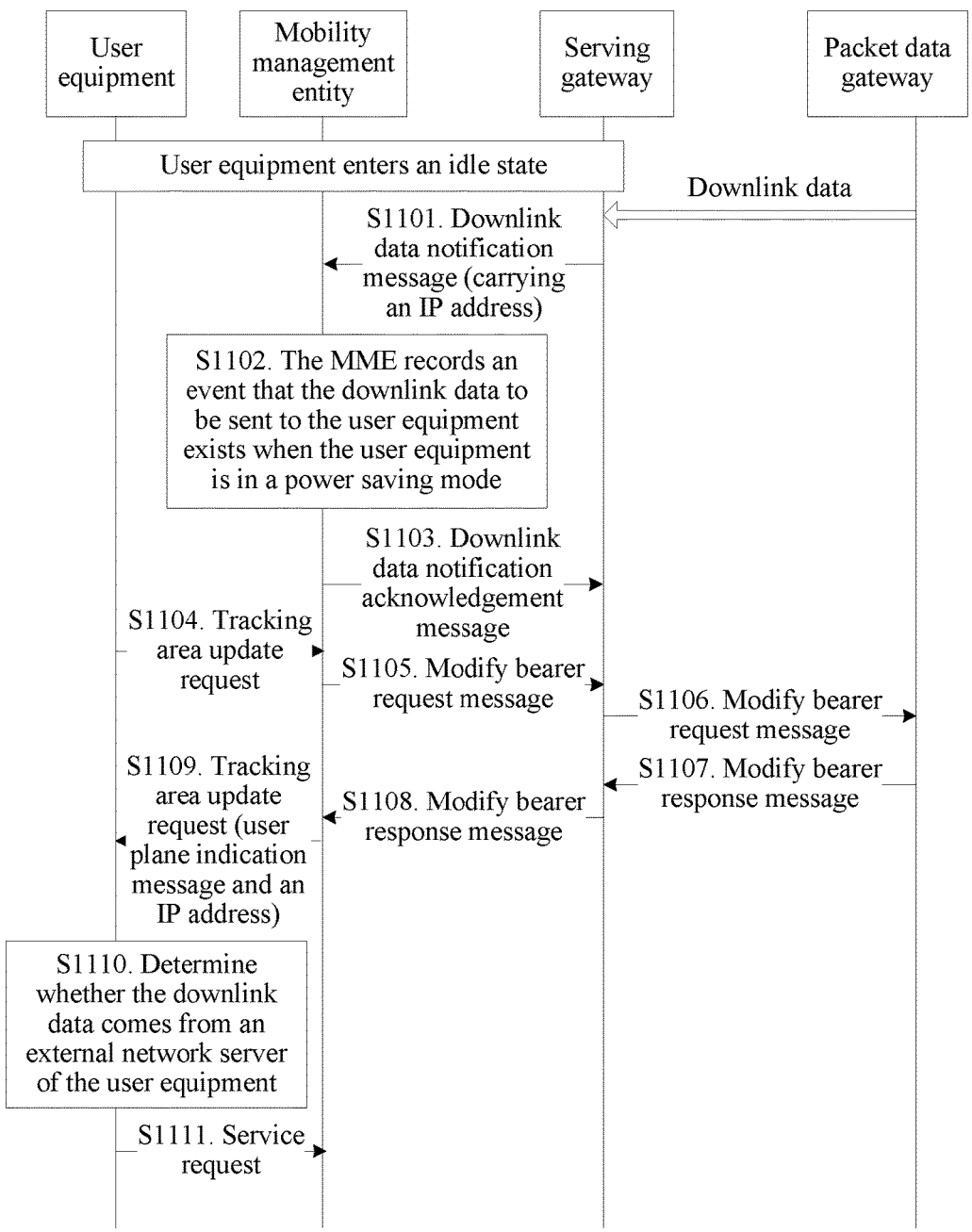
FIG. 11 is a schematic diagram of a further embodiment of a method for saving power of UE according to the present disclosure.

Referring to FIG. 11, FIG. 11 is a schematic diagram of a further embodiment of a method for saving power of UE according to the present disclosure.

In this embodiment of the present disclosure, a S-GW adds a source address of downlink data to a downlink data notification message sent to an MME, and the MME includes the source address of the downlink data into an indication message sent to UE so that the UE determines, according to address information, whether the downlink data comes from an external network server of the UE, and the UE initiates, when the downlink data comes from the external network server, a service request to set up a data bearer so as to avoid that the UE sets up a data bearer due to a packet that does not come from the server.

S1101. When UE is in an idle state, a S-GW receives downlink data, and sends a downlink data notification message Downlink Data Notification to an MME, where the downlink data notification message carries a source IP address of the downlink data.

S1102. The MME receives the downlink data notification message Downlink Data Notification sent by the S-GW, and when determining that the UE is in a power saving mode, the MME records an event that the downlink data to be sent to the UE exists when the UE is in a power saving mode.

Optionally, the MME may cache the downlink data, or may not cache the downlink data.

S1103. The MME sends a downlink data notification acknowledgement message Downlink Data Notification Ack to the S-GW, where the message carries a reject cause value.

S1104. The UE initiates a periodical tracking area update request TAU request to the MME.

S1105. The MME sends a modify bearer request message Modify Bearer Request to the S-GW, and provides current location information and the like of the UE. When the S-GW determines, according to the message sent by the MME, that a location of the UE changes, execute S1106 and S1107; otherwise, execute S1108.

S1106. When the location of the UE changes, the S-GW sends the modify bearer request message Modify Bearer Request to a P-GW.

S1107. The P-GW sends a modify bearer response message Modify Bearer Response to the S-GW.

S1108. The S-GW sends the modify bearer response message Modify Bearer Response to the MME.

S1109. The MME sends a tracking area update accept message TAU accept to the UE, includes a source address of the downlink data into the message, and indicates, by using an indication message, that the downlink data to be sent to the UE exists when the UE saves power. Optionally, the indication message is used to indicate that the UE needs to set up a data bearer.

S1110. The UE determines, according to the source address of the downlink data, whether the downlink data comes from an external network server of the UE. If the downlink data comes from the external network server of the UE, execute S1111, and if the downlink data does not come from the external network server of the UE, skip executing S1111.

S1111. The UE initiates, according to the indication message, a service request to set up a data bearer.

Further, after setting up the data bearer, the UE may send a data packet to the external network server to query whether a service triggered by the external network server exists so as to obtain the downlink service data. Alternatively, the UE may wait for the external network server to send the data to the UE. Optionally, when the MME caches the downlink data, the UE may acquire the downlink data from the MME.

In this embodiment of the present disclosure, when a downlink data notification message sent by a S-GW carries a source address of downlink data, an MME adds the source address of the downlink data to an indication message sent to UE, and the UE determines, according to the source address of the downlink data, whether the downlink data comes from an external network server of the UE. If the downlink data comes from the external network server of the UE, the UE initiates a service request to set up a data bearer, and if the downlink data does not come from the external network server of the UE, the data bearer is not set up so as to avoid that the UE sets up a data bearer due to a packet that does not come from the server.

Even Yet Another Embodiment

Figure 12:
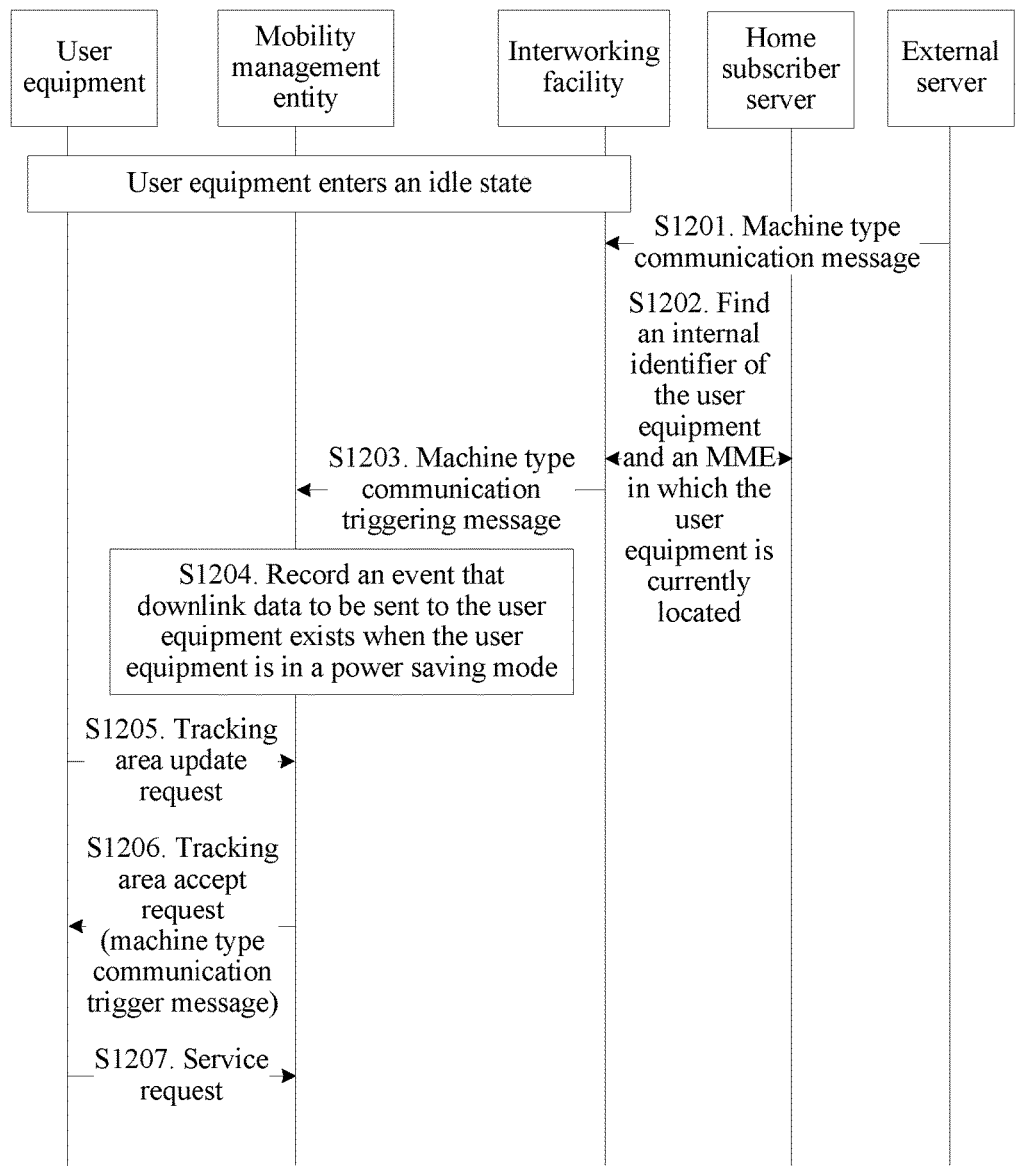
FIG. 12 is a schematic diagram of a still further embodiment of a method for saving power of UE according to the present disclosure.

Referring to FIG. 12, FIG. 12 is a schematic diagram of still further embodiment of a method for saving power of UE according to the present disclosure.

In FIG. 12, an Inter Working Facility (IWF) is an interworking facility and a Server is an external network server.

S1201. The external network server sends an MTC message to the IWF entity and indicates an address of the external network server and an external identifier of UE by using the message.

S1202. The IWF finds, by using the HSS, an internal identifier of the UE and an MME in which the UE is currently located.

S1203. The IWF sends an MTC trigger message MTC Trigger to the MME, and indicates the address of the external network server.

S1204. The MME receives the MTC trigger message that includes address information of the external network server, when determining that the UE is in a power saving mode, the MME records an event that downlink data to be sent to the UE exists when the UE is in a power saving mode.

S1205. The UE initiates a periodical tracking area update request TAU request to the MME.

In the embodiment shown in FIG. 12, a procedure of interaction between the MME and a gateway after the MME receives the TAU request sent by the UE is omitted. For specific implementation of the interaction procedure, reference may be made to the foregoing several embodiments, and details are not described herein.

S1206. The MME sends a tracking area update accept message TAU accept to the UE, indicates, by using an indication message (MTC trigger), that the downlink data to be sent to the UE exists when the UE saves power, and indicates that the UE needs to set up a data bearer, where the message further carries the address information of the external network server.

S1207. The UE initiates, according to the indication message, a service request to set up the data bearer.

Further, after setting up the data bearer, the UE may send, according to the address information of the external network server, a data packet to the external network server to query whether a service triggered by the external network server exists so as to obtain the downlink service data. Alternatively, the UE may wait for the external network server to send the data to the UE.

In this embodiment of the present disclosure, when receiving an MTC trigger message that includes address information of an external network server, an MME determines that downlink data to be sent to UE exists, and records an event when determining that the UE is in a power saving mode, when the UE initiates a TAU request, the MME instructs, according to the recorded event by using an indication message, the UE that the downlink data to be sent to the UE exists when the UE is in a power saving mode, and notifies the UE of setting up a data bearer. In this case, the UE initiates, when receiving the indication message sent by the MME and determining, according to the indication message, that the downlink data to be sent to the UE exists when the UE is in a power saving mode, a service request to a network side to set up the data bearer. Different from a manner, in the prior art, of setting up a data bearer each time UE initiates a TAU request, the method provided in this embodiment of the present disclosure greatly reduces frequency of setting up a data bearer between the UE and the network side, reduces signaling exchanges, and saves power of the UE.

Even Yet Another Embodiment

Figure 13:
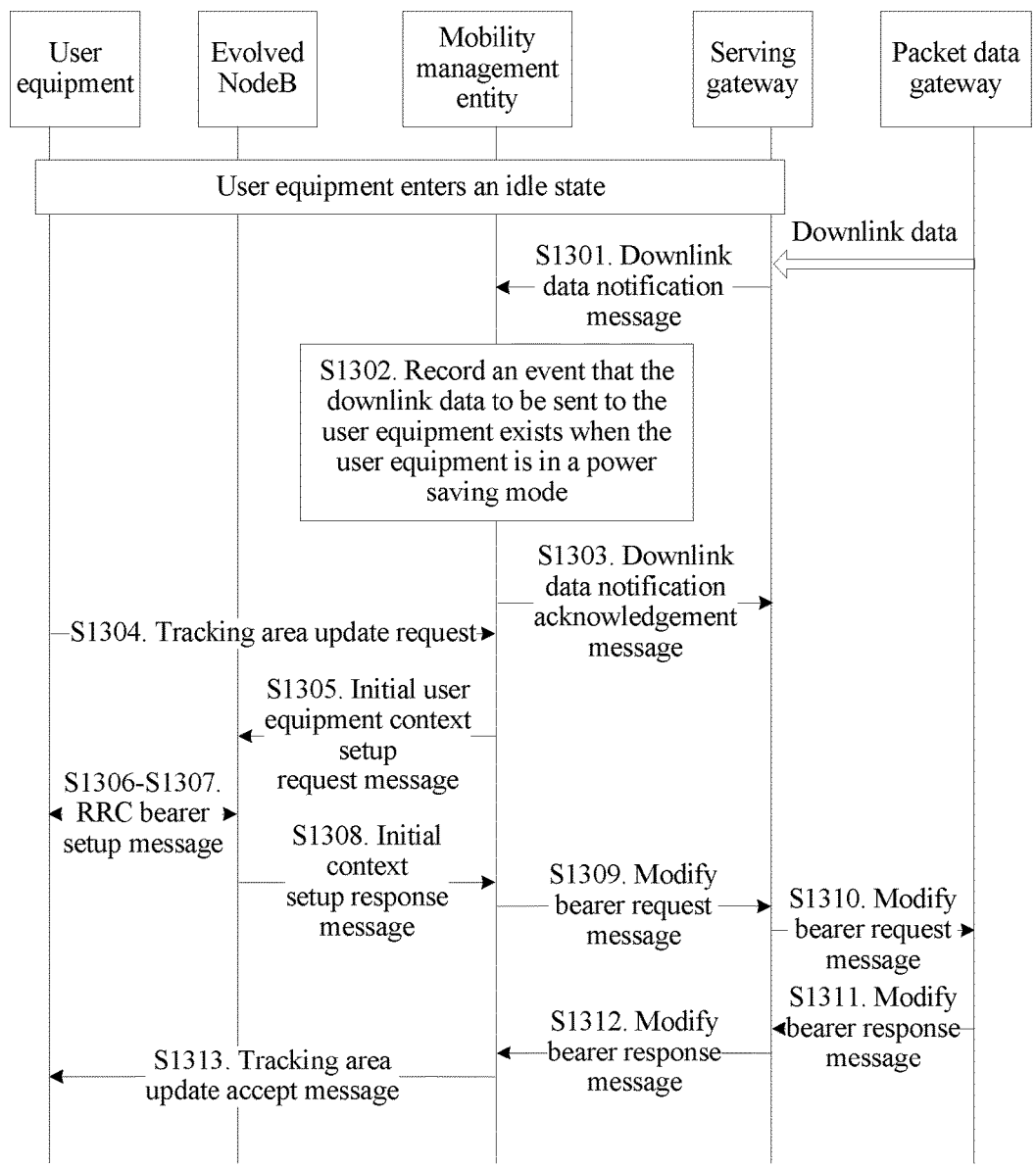
FIG. 13 is a schematic diagram of a yet further embodiment of a method for saving power of UE according to the present disclosure.

Referring to FIG. 13, FIG. 13 is a schematic diagram of a yet further embodiment of a method for saving power of UE according to the present disclosure.

Different from the foregoing several embodiments, in this embodiment of the present disclosure, a core network node device MME sets up a data bearer, instead of instructing the UE to set up the data bearer.

S1301. When UE is in an idle state, a S-GW receives downlink data, and sends a downlink data notification message Downlink Data Notification to an MME.

S1302. The MME receives the downlink data notification message Downlink Data Notification sent by the S-GW, and when determining that the UE is in a power saving mode, the MME records an event that the downlink data to be sent to the UE exists when the UE is in a power saving mode. Optionally, the MME may cache the downlink data, or may not cache the downlink data.

S1303. The MME sends a downlink data notification acknowledgement message Downlink Data Notification Ack to the S-GW, where the message carries a reject cause value.

S1304. The UE initiates a periodical tracking area update request TAU request to the MME.

S1305. The MME initiates a procedure for setting up a data plane bearer, for example, sends an initial UE context setup request message to a radio access node device eNB, where the initial UE context setup request message carries bearer information.

S1306. The eNB sends a RRC bearer setup message to the UE to notify the UE that the downlink data to be sent to the UE exists when the UE is in a power saving mode.

S1307. The UE sends an RRC bearer response message to the eNB.

S1308. After setting up an RRC bearer with the UE, the eNB sends an initial context setup response message to the MME.

S1309. The MME sends a modify bearer request message Modify Bearer Request to the S-GW, and provides current location information and the like of the UE. When the S-GW determines, according to the message sent by the MME, that a location of the UE changes, execute steps S1310 and S1311; otherwise, execute step S1312.

S1310. When the location of the UE changes, the S-GW sends the modify bearer request message Modify Bearer Request to a P-GW.

S1311. The P-GW sends a modify bearer response message Modify Bearer Response to the S-GW.

S1312. The S-GW sends the modify bearer response message Modify Bearer Response to the MME.

S1313. The MME sends a tracking area update accept message TAU accept to the UE.

Further, the UE may wait for an external network server to send the data to the UE so as to obtain the downlink data. Still further, if the MME caches the downlink data, the MME may also send the downlink data to the UE after setting up a data bearer.

Still further, when the downlink data notification message sent by the S-GW carries a source address of the downlink data, the MME may also determine, according to the source address of the downlink data, whether the downlink data comes from the external network server of the UE. If the downlink data comes from the external network server of the UE, the MME actively sets up a data bearer, and if the downlink data does not come from the external network server of the UE, the MME sends a TAU accept message when receiving the TAU request, and does not set up the data plane bearer with the UE.

In this embodiment of the present disclosure, an MME records an event when determining that UE is in a power saving mode and that downlink data to be sent to the UE exists, and when the UE initiates a TAU request, the MME actively initiates a data bearer according to the recorded event, and instructs, by using an implicit indication message, the UE that the downlink data to be sent to the UE exists when the UE is in a power saving mode. In this case, the MME actively sets up the data bearer with the UE when determining that the downlink data to be sent to the UE exists when the UE is in a power saving mode. Different from a manner, in the prior art, of setting up a data bearer each time UE initiates a TAU request, the method provided in this embodiment of the present disclosure greatly reduces frequency of setting up a data bearer between the UE and a network side, reduces signaling exchanges, and saves power of the UE.

It should be noted that, steps in the foregoing embodiments of the present disclosure are not indispensable, but merely exemplary descriptions. Another embodiment may also be obtained from the foregoing embodiments in a modification, variation, or combination manner, which all fall within the protection scope of the present disclosure.

A person of ordinary skill in the art should understand that the processes of the methods in the embodiments may be implemented by a program instructing relevant hardware. The program may be stored in a readable storage medium. When the program runs, the corresponding steps of the methods according to the embodiments of the present disclosure are performed. The storage medium may be a read-only memory (ROM)/RAM, a magnetic disk, an optical disk, and the like.

The foregoing descriptions are merely exemplary implementation manners of the present disclosure. It should be noted that a person of ordinary skill in the art may make several improvements or polishing without departing from the principle of the present disclosure and the improvements or polishing shall fall within the protection scope of the present disclosure.

What is claimed is:

1. A mobile management entity (MME) of a telecommunication network comprising:
   a receiver;
   a transmitter; and
   a processor coupled to the receiver and the transmitter, the processor being configured to:
     receive, via the receiver, a downlink data notification message from a gateway;
     determine from the downlink data notification message that there is downlink data for user equipment (UE), the downlink data not being deliverable to the UE due to the UE being in a power saving mode;
     receive, via the receiver, a tracking area update (TAU) request from the UE; and
     send to a base station, via the transmitter upon receiving the TAU request, an initial UE context setup request message to request the base station to set up a data bearer with the UE and to notify the UE that there is the downlink data for the UE, the initial UE context setup request message being sent without sending a paging message to the UE.

2. The MME of claim 1, wherein the processor is further configured to receive, via the receiver, an initial context setup response message from the base station after the base station sets up a radio resource control (RRC) bearer with the UE.

3. The MME of claim 2, wherein the processor is further configured to send, via the transmitter after the initial context setup response message from the base station is received with the transmitter, a TAU accept message to the UE.

4. A method performed by a mobility management entity (MME) of a telecommunication network for communicating with user equipment (UE), the method comprising:
receiving a downlink data notification message from a gateway;
determining from the downlink data notification message that there is downlink data for the UE, the downlink data not being deliverable to the UE due to the UE being in a power saving mode;
receiving a tracking area update (TAU) request from the UE; and
sending to a base station, upon receiving the TAU request, an initial UE context setup request message to request the base station to set up a data bearer with the UE and to notify the UE that there is the downlink data for the UE, the initial UE context setup request message being sent without sending a paging message to the UE.

5. The method of claim 4, further comprising receiving an initial context setup response message from the base station after the base station sets up a radio resource control (RRC) bearer with the UE.

6. The method of claim 5, further comprising sending, after the initial context setup response message from the base station is received, a TAU accept message to the UE.

7. A non-transitory computer-readable storage medium comprising instructions which, when executed by a processor of a mobility management entity (MME) of a telecommunication network, cause the MME to perform operations comprising:
receiving a downlink data notification message from a gateway;
determining from the downlink data notification message that there is downlink data for user equipment (UE), the downlink data not being deliverable to the UE due to the UE being in a power saving mode;
receiving a tracking area update (TAU) request from the UE; and
sending to a base station, upon receiving the TAU request, an initial UE context setup request message to request the base station to set up a data bearer with the UE and to notify the UE that there is the downlink data for the UE, the initial UE context setup request message being sent without sending a paging message to the UE.

8. The non-transitory computer-readable storage medium of claim 7, wherein the operations further comprise receiving an initial context setup response message from the base station after the base station sets up a radio resource control (RRC) bearer with the UE.

9. The non-transitory computer-readable storage medium of claim 8, wherein the operations further comprise sending, after the initial context setup response message from the base station is received, a TAU accept message to the UE.

* * * * *

UNITED STATES PATENT AND TRADEMARK OFFICE
CERTIFICATE OF CORRECTION

PATENT NO. : 10,299,211 B2
APPLICATION NO. : 15/358616
DATED : May 21, 2019
INVENTOR(S) : Xiaoyan Shi et al.

Page 1 of 1

It is certified that error appears in the above-identified patent and that said Letters Patent is hereby corrected as shown below:

On the Title Page

Page 2, Column 2, Lines 21-23, should read:
Foreign Communication From A Counterpart Application, PCT Application No.
PCT/CN2014/078106, English Translation of Written Opinion dated February 17, 2015, 8 pages.

Signed and Sealed this
Twenty-third Day of July, 2019

Andrei Iancu
*Director of the United States Patent and Trademark Office*